(12) United States Patent
Livanos et al.

(10) Patent No.: US 9,621,362 B2
(45) Date of Patent: Apr. 11, 2017

(54) SYSTEM AND METHOD FOR PROVIDING POLICY CHARGING AND RULES FUNCTION DISCOVERY IN A NETWORK ENVIRONMENT

(71) Applicant: CISCO TECHNOLOGY, INC., San Jose, CA (US)

(72) Inventors: Konstantin Livanos, Naperville, IL (US); Ian McDowell Campbell, Bow Mar, CO (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 94 days.

(21) Appl. No.: 14/612,827

(22) Filed: Feb. 3, 2015

(65) Prior Publication Data
US 2016/0226669 A1 Aug. 4, 2016

(51) Int. Cl.
*H04L 12/16* (2006.01)
*H04L 12/14* (2006.01)
(Continued)

(52) U.S. Cl.
CPC ...... *H04L 12/1407* (2013.01); *H04L 41/0893* (2013.01); *H04M 15/66* (2013.01);
(Continued)

(58) Field of Classification Search
None
See application file for complete search history.

(56) References Cited

U.S. PATENT DOCUMENTS 6,483,820 B1  11/2002 Davidson et al.
7,379,739 B2   5/2008 Rajkotia et al.
(Continued)

FOREIGN PATENT DOCUMENTS

CN  102378288       3/2012
CN  105050072 A    11/2015
(Continued)

OTHER PUBLICATIONS

U.S. Appl. No. 14/534,792, filed Nov. 6, 2014, entitled "System and Method for Providing Message Delivery and Paging to a Group of Users in a Network Environment," Inventors: Maulik Vijay Vaidya, et al.
(Continued)

*Primary Examiner* — Otis L Thompson, Jr.
(74) *Attorney, Agent, or Firm* — Patent Capital Group

(57) ABSTRACT

A method is provided in one example embodiment and may include establishing a first binding for a first session for a UE, wherein the first binding includes, at least in part, PCEF connectivity information for a PCEF associated with a PGW hosting the first session for the UE, wherein the first binding is established by a first DRA in a first IP domain; receiving a request by second DRA in a second IP domain associated with establishing a second session for the UE; determining a PCRF serving the first session for the UE; and binding the second session for the UE with the first session for the UE. A method is provided in another example embodiment and may include exchanging PCEF connectivity information over a Dr interface between a plurality DRAs and maintaining PCEF connectivity information for one or more peer DRAs to which each DRA is connected.

20 Claims, 10 Drawing Sheets

(51) Int. Cl.
*H04M 15/00* (2006.01)
*H04W 4/24* (2009.01)
*H04L 12/24* (2006.01)
*H04L 29/08* (2006.01)

(52) U.S. Cl.
CPC .............. *H04W 4/24* (2013.01); *H04L 67/10* (2013.01); *H04L 67/1002* (2013.01)

(56) References Cited

U.S. PATENT DOCUMENTS

| | | |
|---|---|---|
| 7,983,667 B2 | 7/2011 | Hart et al. |
| 8,107,950 B2 | 1/2012 | Amerijoo et al. |
| 8,320,965 B2 | 11/2012 | Kwun |
| 8,340,711 B1 | 12/2012 | Glass et al. |
| 8,588,698 B2 | 11/2013 | Brisebois |
| 8,611,299 B2 | 12/2013 | Yang et al. |
| 8,639,243 B2 | 1/2014 | Radulescu et al. |
| 8,712,459 B2 | 4/2014 | Lim et al. |
| 8,792,886 B2 | 7/2014 | Meshkati |
| 8,830,936 B2 | 9/2014 | Ren |
| 8,917,658 B2 | 12/2014 | Bjork |
| 9,219,816 B2 | 12/2015 | Grayson et al. |
| 9,226,255 B2 | 12/2015 | Grayson et al. |
| 9,350,737 B2 | 5/2016 | Fernandez Alonso |
| 2005/0036462 A1 | 2/2005 | Sillasto et al. |
| 2006/0229087 A1 | 10/2006 | Davis et al. |
| 2007/0008885 A1 | 1/2007 | Bonner |
| 2009/0137246 A1 | 5/2009 | Xing |
| 2009/0305684 A1 | 12/2009 | Jones |
| 2010/0056184 A1 | 3/2010 | Vakil |
| 2010/0112982 A1 | 5/2010 | Singh et al. |
| 2010/0124929 A1 | 5/2010 | Lee |
| 2010/0135237 A1 | 6/2010 | Papasakellariou |
| 2010/0157922 A1 | 6/2010 | Kim et al. |
| 2010/0182955 A1 | 7/2010 | Bjork |
| 2010/0240314 A1 | 9/2010 | Chang |
| 2010/0260036 A1 | 10/2010 | Molnar et al. |
| 2010/0260068 A1 | 10/2010 | Bhatt et al. |
| 2010/0279628 A1 | 11/2010 | Love et al. |
| 2011/0110316 A1 | 5/2011 | Chen et al. |
| 2011/0128913 A1 | 6/2011 | Chowdhury |
| 2011/0130144 A1 | 6/2011 | Schein |
| 2011/0170481 A1 | 7/2011 | Gomes |
| 2011/0177817 A1 | 7/2011 | Hole |
| 2011/0201333 A1 | 8/2011 | Kwon |
| 2011/0211514 A1 | 9/2011 | Hamalainin |
| 2011/0237283 A1 | 9/2011 | Shan et al. |
| 2011/0267967 A1 | 11/2011 | Ratasuk |
| 2011/0314178 A1 | 12/2011 | Kanode |
| 2012/0004003 A1 | 1/2012 | Shaheen et al. |
| 2012/0015653 A1 | 1/2012 | Paliwal |
| 2012/0100849 A1 | 4/2012 | Marisco |
| 2012/0129537 A1 | 5/2012 | Liu et al. |
| 2012/0191842 A1 | 7/2012 | Hu et al. |
| 2012/0210003 A1 | 8/2012 | Castro |
| 2012/0258720 A1 | 10/2012 | Tinnakornsrisuphap et al. |
| 2012/0260299 A1 | 10/2012 | Kotecha |
| 2012/0265888 A1 | 10/2012 | Roeland et al. |
| 2012/0269167 A1 | 10/2012 | Velev |
| 2012/0276913 A1 | 11/2012 | Lim |
| 2012/0290452 A1 | 11/2012 | Pancorbo Marcos |
| 2012/0327850 A1 | 12/2012 | Wang et al. |
| 2013/0003697 A1 | 1/2013 | Adjakple et al. |
| 2013/0077482 A1 | 3/2013 | Krishna et al. |
| 2013/0114484 A1 | 5/2013 | Suzuki |
| 2013/0132570 A1 | 5/2013 | Lopez Nieto |
| 2013/0136072 A1 | 5/2013 | Bachmann et al. |
| 2013/0139221 A1 | 5/2013 | Gundavelli |
| 2013/0155948 A1 | 6/2013 | Pinheiro |
| 2013/0155954 A1 | 6/2013 | Wang et al. |
| 2013/0163543 A1 | 6/2013 | Freda et al. |
| 2013/0182680 A1 | 7/2013 | Choi et al. |
| 2013/0210431 A1 | 8/2013 | Abe |
| 2013/0229945 A1 | 9/2013 | Cha et al. |
| 2013/0235759 A1 | 9/2013 | Meshkati |
| 2013/0294356 A1 | 11/2013 | Bala et al. |
| 2013/0308531 A1 | 11/2013 | So et al. |
| 2013/0326001 A1 | 12/2013 | Jorgensen et al. |
| 2013/0337769 A1 | 12/2013 | Bhatia |
| 2013/0337821 A1 | 12/2013 | Clegg |
| 2013/0339783 A1 | 12/2013 | Fernandez Alonso et al. |
| 2013/0343288 A1 | 12/2013 | Ratasuk et al. |
| 2013/0343304 A1 | 12/2013 | Kaippallimalil et al. |
| 2014/0003225 A1 | 1/2014 | Mann et al. |
| 2014/0010086 A1 | 1/2014 | Etemad et al. |
| 2014/0011505 A1 | 1/2014 | Liao |
| 2014/0016629 A1 | 1/2014 | Pancorbo Marcos |
| 2014/0078986 A1 | 3/2014 | Kaippallimalil et al. |
| 2014/0086226 A1 | 3/2014 | Zhao et al. |
| 2014/0094139 A1 | 4/2014 | Xu |
| 2014/0112251 A1 | 4/2014 | Kim et al. |
| 2014/0126453 A1 | 5/2014 | Park |
| 2014/0146732 A1 | 5/2014 | Olufunmilola et al. |
| 2014/0155109 A1 | 6/2014 | Vaidya et al. |
| 2014/0177583 A1 | 6/2014 | Aso |
| 2014/0185537 A1 | 7/2014 | Papasakellariou |
| 2014/0241316 A1 | 8/2014 | Okmyanskiy et al. |
| 2014/0254367 A1 | 9/2014 | Jeong |
| 2014/0287759 A1 | 9/2014 | Purohit |
| 2014/0287769 A1 | 9/2014 | Taori |
| 2014/0297888 A1* | 10/2014 | McCann .................. H04L 45/70 709/243 |
| 2014/0301351 A1 | 10/2014 | Gao |
| 2014/0307589 A1* | 10/2014 | Li ........................ H04L 12/1407 370/259 |
| 2014/0321328 A1 | 10/2014 | Zuniga |
| 2014/0328266 A1 | 11/2014 | Yu |
| 2014/0342745 A1 | 11/2014 | Bhushan |
| 2014/0378131 A1* | 12/2014 | Rui ...................... H04W 76/022 455/433 |
| 2015/0009826 A1 | 1/2015 | Ma |
| 2015/0044989 A1 | 2/2015 | De Foy |
| 2015/0055588 A1 | 2/2015 | Yerramalli et al. |
| 2015/0063101 A1 | 3/2015 | Touati |
| 2015/0103768 A1 | 4/2015 | Chen |
| 2015/0103772 A1 | 4/2015 | Carnero Ros |
| 2015/0146594 A1 | 5/2015 | Grayson |
| 2015/0172471 A1 | 6/2015 | Castro |
| 2015/0181577 A1 | 6/2015 | Moulsley |
| 2015/0200760 A1 | 7/2015 | Xia |
| 2015/0208403 A1 | 7/2015 | Takeda |
| 2015/0222634 A1 | 8/2015 | Ludwig |
| 2015/0245241 A1 | 8/2015 | Posz |
| 2015/0264652 A1 | 9/2015 | Zhang |
| 2015/0296516 A1 | 10/2015 | Jung |
| 2015/0365931 A1 | 12/2015 | Ng et al. |
| 2015/0382386 A1 | 12/2015 | Castro Castro |
| 2016/0007170 A1 | 1/2016 | Vaidya et al. |
| 2016/0007316 A1 | 1/2016 | Vaidya et al. |
| 2016/0007378 A1 | 1/2016 | Bertorelle |
| 2016/0037490 A1 | 2/2016 | Pazhyannur et al. |
| 2016/0037550 A1 | 2/2016 | Barabell |
| 2016/0073282 A1 | 3/2016 | Speicher |
| 2016/0073283 A1 | 3/2016 | Grayson et al. |
| 2016/0073285 A1 | 3/2016 | Graham et al. |
| 2016/0073328 A1 | 3/2016 | Li |
| 2016/0094976 A1 | 3/2016 | Enomoto |
| 2016/0099794 A1 | 4/2016 | Chendamarai Kannan et al. |
| 2016/0127137 A1* | 5/2016 | Fernandez Alonso ...... H04L 41/0893 370/259 |
| 2016/0134761 A1 | 5/2016 | Campbell et al. |
| 2016/0135143 A1 | 5/2016 | Won et al. |
| 2016/0156729 A1 | 6/2016 | Essigmann |
| 2016/0165494 A1 | 6/2016 | Warburton et al. |
| 2016/0191631 A1 | 6/2016 | Haraszti |
| 2016/0227428 A1 | 8/2016 | Novlan et al. |
| 2016/0234706 A1 | 8/2016 | Liu et al. |
| 2016/0234763 A1 | 8/2016 | Um et al. |
| 2016/0242203 A1 | 8/2016 | You |

(56) References Cited

U.S. PATENT DOCUMENTS

| | | | |
|---|---|---|---|
| 2016/0262041 | A1 | 9/2016 | Ronneke |
| 2016/0295357 | A1 | 10/2016 | Grayson et al. |
| 2016/0295521 | A1 | 10/2016 | Grayson et al. |

FOREIGN PATENT DOCUMENTS

| | | |
|---|---|---|
| CN | 105307279 | 2/2016 |
| CN | 105407509 | 3/2016 |
| CN | 105407540 | 3/2016 |
| CN | 105592460 | 5/2016 |
| EP | 2234422 | 9/2010 |
| EP | 2453700 | 5/2012 |
| EP | 2466831 | 6/2012 |
| EP | 2757850 | 7/2014 |
| EP | 2981119 | 2/2016 |
| EP | 2993868 | 3/2016 |
| EP | 2996386 | 3/2016 |
| EP | 3029988 | 6/2016 |
| EP | 3046386 | 7/2016 |
| WO | WO2009/025601 | 2/2009 |
| WO | WO2011/002958 | 1/2011 |
| WO | WO2011/085238 | 7/2011 |
| WO | WO2011/134529 | 11/2011 |
| WO | WO2012/055984 | 5/2012 |
| WO | WO2012/135121 | 10/2012 |
| WO | WO2013/041574 | 3/2013 |
| WO | WO2013/082245 | 6/2013 |
| WO | WO2013/086659 | 6/2013 |
| WO | WO2013/169991 | 11/2013 |
| WO | WO2014/051606 | 4/2014 |
| WO | WO2014/177208 | 11/2014 |
| WO | WO2016/126414 | 8/2016 |

OTHER PUBLICATIONS

U.S. Appl. No. 14/450,040, filed Aug. 1, 2014, entitled "System and Method for Media Access Control Scheduler for a Long Term Evolution Unlicensed Network Environment," Inventors: Rajesh S. Pazhyannur, et al.
U.S. Appl. No. 14/480,284, filed Sep. 8, 2014, entitled "System and Method for Internet Protocol Version-Based Multiple Access Point Name Support in a Network Environment," Inventors: Mark Grayson, et al.
U.S. Appl. No. 14/481,654, filed Sep. 9, 2014, entitled "System and Method for Supporting Cell Updates Within Small Cell Cluster for Mobility in Cell Paging Channel Mode," Inventors: Mickael Graham, et al.
U.S. Appl. No. 14/536,642, filed Nov. 9, 2014, entitled "System and Method for Radio Aware Traffic Management Based Wireless Authorization," Inventors: Ian McDowell Campbell, et al.
U.S. Appl. No. 14/534,883, filed Nov. 6, 2014, entitled "System and Method for Providing Message Delivery and Paging to a Group of Users in a Network Environment," Inventors: Maulik Vijay Vaidya, et al.
U.S. Appl. No. 14/612,794, filed Feb. 3, 2015, entitled "System and Method for Providing Collaborative Neighbor Management in a Network Environment," Inventors: Nigel Edward Warbuton, et al.
U.S. Appl. No. 14/597,036, filed Jan. 14, 2015, entitled "System and Method for Providing Collision-Avoided Physical Downlink Control Channel Resource Allocation in a Network Environment," Inventors: Qing Zhao, et al.
U.S. Appl. No. 14/614,500, filed Feb. 5, 2015, entitled "System and Method for Providing Policy Charging and Rules Function Discovery in a Network Environment," Inventors: Konstantin Livanos, et al.
"3GPP TS 23.203 V13.1.0 (Sep. 2014) Technical Specification: 3rd Generation Partnership Project; Technical Specification Group Services and System Aspects; Policy and charging control architecture (Release 13)," [Relevant Sections 1-6 only]; 3rd Generation Partnership Project, Sep. 2014.
"3GPP TS 32.522 v11.2.0, 3rd Generation Partnership Project Technical Specification: Group Services and System Aspects; Telecommunication management; Self-Organizing Networks (SON) Policy Network Resource Model (NRM) Integration Reference Point (IRP); Information Service (IS) (Release 11)," 3GPP, 650 Route des Lucioles, F-06921 Sophia Antipolis Valbonne, France, Jun. 2012, 35 pages.
3GPP TSG-RAN WG3 #61bis, R3-081174, "Solution for interference reduction SON use case," Orange, Alcatel-Lucent, Agenda Item 10.1.1c; Kansas City, MO, USA; 6 pages.
3GPP-TSG-RAN WG3 Meeting #60, R3-081123, "Dynamic Setup of HNBS for Energy Savings and Interference Reduction," Mitsubishi Electric, Agenda Item 10.1.1c; Kansas City, MO USA, May 5-9, 2008; 6 pages.
3GPP-TSG-RAN3 #59, R3-080082, "Capacity and Coverage SON Use Case," Alcatel-Lucent, Agenda Item 10.1.1.c; Sorrento, Italy, Feb. 11-15, 2008; 4 pages.
"ETSI TS 123 007 V12.6.0 (Oct. 2014) Technical Specification: Digital Cellular Telecommunications System (Phase 2+); Universal Mobile Telecommunications System (UMTS); LTE; Restoration procedures (EGPP TS 23.007 version 12.6.0 Release 12)," ETSI, 650 Route des Lucioles, F-06921, Sophia Antipolis Cedex—France, Oct. 2014; 93 pages.
"ETSI TS 123 401 V12.6.0 (Sep. 2014) Technical Specification: LTE; General Packet Radio Service (GPRS) enhancements for Evolved Universal Terrestrial Radio Access Network (E-UTRAN) access (3GPP TS 23.401 version 12.6.0 Release 12)," ETSI, 650 Route des Lucioles, F-06921, Sophia Antipolis Cedex—France, Sep. 2014; 308 pages.
"ETSI TS 129 061 V12.7.0 (Oct. 2014) Technical Specification: Digital cellular telecommunications system (Phase 2+); Universal Mobile Telecommunications System (UMTS); LTE; Interworking between the Public Land Mobile Network (PLMN) supporting packet based services and Packet Data Networks (PDN) (3GPP TS 29.061 version 12.7.0 Release 12)," ETSI, 650 Route des Lucioles, F-06921, Sophia Antipolis Cedex—France, Oct. 2014; 170 pages.
"ETSI TS 129 212 V12.6.0 (Oct. 2014) Technical Specification: Universal Mobile Telecommunications System (UMTS); LTE; Policy and Charging Control (PCC); Reference Points (EGPP TS 29.212 version 12.6.0 Release 12)," ETSI, 650 Route des Lucioles, F-06921, Sophia Antipolis Cedex—France, Oct. 2014, 232 pages.
"ETSI TS 129 213 V12.5.0 (Oct. 2014) Technical Specification: Digital Cellular Telecommunications System (Phase 2+); Universal Mobile Telecommunications System (UMTS); LTE; Policy and charging control signalling flows and Quality of Service (QoS) parameter mapping (3GPP TS 29.213 version 12.5.0 Release 12),"[Relevant Sections 3, 4, 8 and 8 only], ETSI, 650 Route des Lucioles, F-06921, Sophia Antipolis Cedex—France, Oct. 2014.
"ETSI TS 129 214 V12.5.0 (Oct. 2014) Technical Specification: Universal Mobile Telecommunications System (UMTS); LTE; Policy and charging control over Rx reference point (3GPP TS 29.214 version 12.5.0 Release 12)," ETSI, 650 Route des Lucioles, F-06921, Sophia Antipolis Cedex—France, Oct. 2014; 64 pages.
"ETSI TS 125 331 V11.10.0 (Jul. 2014) Technical Specification: Universal Mobile Telecommunications System (UMTS); Radio Resource Control (RRC); Protocol Specification," ETSI, 650 Route des Lucioles, F—06921, Sophia Antipolis Cedex—France, Jul. 2014, © European Telecommunications Standards Institute 2014. All Rights Reserved. [Relevant Portions: §7.2.2 pp. 55-58; §8.1.2 pp. 105-108; §8.1.4 pp. 126-129; §8.3.1 pp. 215-260; §8.3.8 — 8.3.9 pp. 289-292; §8.5.21 pp. 357-365; §10.2.7 pp. 620-623; Annex B.3 pp. 2045-2052].
"ETSI TS 125 469 V11.2.0 (Apr. 2013) Technical Specification: Universal Mobile Telecommunications System (UMTS); UTRAN Iuh interface Home Node B (HNB) Application Part (HNBAP) signaling (3GPP TS 25.469 version 11.2.0 Release 11)," © European Telecommunications Standards Institute 2013; Apr. 2013; 78 pages.
"ETSI TS 125 469 V9.3.0 (Oct. 2010) Technical Specification: Universal Mobile Telecommunications System (UMTS); UTRAN Iuh interface Home Node B (HNG) Application Part (HNBAP) signaling (3GPP TS 25.469 version 9.3.0 Release 9)," © European Telecommunications Standards Institute 2010; Oct. 2010; 64 pages.

(56) References Cited

OTHER PUBLICATIONS

"ETSI TS 123 401 V12.70 (Jan. 2015) Technical Specification: LTE; General Packet Radio Service (GPRS) enhancements for Evolved Universal Terrestrial Radio Access Network (E-UTRAN) access (3GPP TS 23.401 version 12.7.0 Release 12)," Section 4 only, European Telecommunications Standards Institute, 650 Route des Lucioles, F-06921 Sophia Antipolis Cedex, France; Jan. 2015; 77 pages.

"ETSI TS 125 367 V9.4.0, Universal Mobile Telecommunications System (UMTS); Mobility procedures for Home Node B (HNB); Overall description; Stage 2 (3GPP TS25.367 version 9.4.0 Release 9)", European Telecommunications Standards Institute, 650 Route des Lucioles, F-06921 Sophia Antipolis Cedex, France, Jun. 2010; 17 pages.

"LTE Quick Reference: Resource Allocation and Management Unit," LTE Handbook, Share Tech note, first published on or about Jul. 13, 2012 http://www.sharetechnote.com/html/Handbook_LTE_ResourceAllocation_ManagementUnit.html.

"Broadband Forum Technical Report: TR-196 Femto Access Point Service Data Model," Issue: 1, Issue Date: Apr. 2009, ©The Broadband Forum; 131 pages.

Broadband Forum, "TR-069 CPE WAN Management Protocol," Broadband Forum Technical Report, Issue: 1 Amendment 4, Issue Date: Jul. 2011, Protocol Version 1.3, © The Broadband Forum. All Rights Reserved; 190 pages.

Broadband Forum, "TR-196 Femto Access Point Service Data Model," Broadband Forum Technical Report, Issue 2, Issue Date: Nov. 2011, © The Broadband Forum. All Rights Reserved; 46 pages.

"Cisco Licensed Small Cell Solution: Reduce Costs, Improve Coverage and Capacity—Solution Overview," Cisco Systems, Inc., C22-726686-00, Feb. 2013, © 2013 Cisco and/or its affiliates. All Rights Reserved. Printed in USA, 13 pages.

"Extensible Authentication Protocol," Wikipedia, the free encyclopedia, Sep. 16, 2013, 10 pages http://en.wikipedia.org/wiki/Extensible_Authentication_Protocol#EAP-FAST.

"Link Layer Discovery Protocol," Wikipedia, the free encyclopedia, Sep. 25, 2013, 4 pages, http://en.wikipedia.org/wiki/Link_Layer_Discovery_Protocol.

"Radius," Wikipedia, the free encyclopedia, Sep. 26, 2013, 12 pages http://en.wikipedia.org/wiki/RADIUS.

Ashraf, Imran, "Distributed Radio Coverage Optimization in Enterprise Femtocell Networks," International Conference on Communications ICC 2010, May 23-27, 2010, Cape Town, South Africa; 6 pages.

Calhoun, P., "Diameter Base Protocol," Network Working Group RFC 3588, Sep. 2003; 147 pages.

Claussen, Holger, et al., "Self-optimization of Coverage for Femtocell Deployments," DOI 10:10.1109/WTS2008 Wireless Telecommunications Symposium, Apr. 26-28, 2008; Pomona, CA; 8 pages.

Haverinen, H., "Extensible Authentication Protocol Method for Global System for Mobile Communications (GSM) Subscriber Identity Modules (EAP-SIM)," Network Working Group RFC 4186, Jan. 2006, 93 pages.

Horn, Gavin, "3GPP Femtocells: Architecture and Protocols," Qualcomm Incorporated, 5775 Morehouse Drive, San Diego, CA, Sep. 2010; 64 pages.

Nivaggioli, Patrice, "Cisco Small Cell Architecture," Cisco Connect, Dubrovnik, Croatia, South East Europe, May 20-22, 2013, © 2012 Cisco and/or its affiliates. All Rights Reserved.; 40 pages.

EPO Dec. 15, 2015 Extended Search Report and Written Opinion from European Application Serial No. 15178914.6.

Ratasuk, Rapeepat, et al., "License-exempt LTE Deployment in Heterogeneous Network," 2012 International Symposium on Wireless Communications Systems (ISWCS), Aug. 28, 2012, pp. 246-250.

Almeida, Erika, et al., "Enabling LTE/Wifi Coexistence by LTE Blank Subframe Allocation," 2013 IEEE International Conference on Communications (ICC), Jun. 9, 2013, pp. 5083-5088.

Saad, Sawsan A., et al., "A Survey on Power Control Techniques in Femtocell Networks," Journal of Communications vol. 8, No. 12, Dec. 2013; 10 pages.

EPO Feb. 8, 2016 Extended Search Report and Written Opinion from European Application Serial No. 15183583.2.

3GPP TSG-RAN WG3 Meeting #73bis R3-112481, "Issues Related to Cell RACH Support for HNB Handover," Alcatel-Lucent, 3GPP Draft, Zhuhai, China, Oct. 10-14, 2011; 10 pages.

3GPP TSG-RAN3 Meeting #69 R3-102094, "Text Proposal for HNBRAP," Alcatel-Lucent, 3GPP Draft, Madrid, Spain, Aug. 23-27, 2010; 62 pages.

"3GPP TS 29.274 V12-6-0 (Sep. 2014) Technical Specification: 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," [Relevant Sections 4-6; 7.1-7.2.15; and 8.1-8.21.6 only]; 3rd Generation Partnership Project; Sep. 2014.

"GSMA LTE Roaming Guidelines, Version 9.0," GSM Association, Official Document IR88, Jan. 24, 2013; 53 pages.

Guttman, E., et al., "Service Location Protocol, Version 2," Network Working Group RFC 2608, Jun. 1999, 57 pages.

Tayal, "All About PDCCH and CCE Allocation—PDCCH (Physical downlink Control Channel)," Tayal's Way to Learn LTE, May 2013; 14 pages http://nitintayal-lte-tutorials.blogspot.com/2013/03/all-about-pdcch-and-ccc-allocation.html.

"3GPP TR 23.852 (V12.0.0 (Sep. 2013) Technical Report: 3rd Generational Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12);" 3rd Generation Partnership Project (3GPP), Sep. 2013, 157 pages.

Droms, R., "Dynamic Host Configuration Protocol," Network Working Group RFC 2131, Mar. 1997; 45 pages.

Leung, K., et al., "WiMAX Forum/3GPP2 Proxy Mobile IPv4," Independent Submission RFC 5563, Feb. 2010; 41 pages.

Narten, T., et al., "Neighbor Discovery for IP version 6 (IPv6)," Network Working Group RFC 4861, Sep. 2007; 97 pages.

"PDCCH Construction, Expert Opinion," posted by Hongyan on May 20, 2011; LTE University, 4 pages http://lteuniversity.com/get_trained/expert_opinion1/b/hongyanlei/archive/2011/05/20/pdcch-construction.aspx.

"PDCCH Processing," published by Gio Zakradze on Dec. 29, 2014; 56 pages.

"ETSI TS 125 331 V11.10.0 (Jul. 2014) Technical Specification: Universal Mobile Telecommunications System (UMTS); Radio Resource Control (RRC); Protocol Specification," ETSI, 650 Route des Lucioles, F-06921, Sophia Antipolis Cedex—France, Jul. 2014, © European Telecommunications Standards Institute 2014. All Rights Reserved. [Relevant Portions: §7.2.2 pp. 55-58; §8.1.2 pp. 105-108; §8.1.4 pp. 126-129; §8.3.1 pp. 215-260; §8.3.8 — 8.3.9 pp. 289-292; §8.5.21 pp. 357-365; §10.2.7 pp. 620-623; Annex B.3 pp. 2045-2052].

"TR-196 Femto Access Point Service Data Model," Broadband Forum Technical Report, Issue 2, Issue Date: Nov. 2011, ©The Broadband Forum. All Rights Reserved; 46 pages.

"TR-069 CPE Wan Management Protocol," Broadband Forum Technical Report, Issue: 1 Amendment 4, Issue Date: Jul. 2011, Protocol Version 1.3, © The Broadband Forum. All Rights Reserved; 190 pages.

Adrangi, F., et al., "Chargeable User Identity," Network Working Group RFC 4372, Jan. 2006, 10 pages.

"3GPP TR23.705 V0.11.0 (May 2014) Technical Report: 3rd Generation Partnership Project; Technical Specification Group Services and System Aspects; Study on system enhancements for user plane congestion management (Release 13)," 3GPP, 650 Route des Lucioles, F-06921, Sophia Antipolis Cedex—France, May 2014, 64 pages.

"3GPP TS23.002 V12.5.0 (Jun. 2014) Technical Specification: 3rd Generation Partnership Project; Technical Specification Group Services and System Aspects; Network architecture (Release 12),"

(56) References Cited

OTHER PUBLICATIONS

3GPP, 650 Route des Lucioles, F-06921, Sophia Antipolis Cedex—France, Jun. 2014; See Sections 1-5, pp. 11-76.

"3GPP TS 29.212 V12.5.2 (Jul. 2014) Technical Specification: 3rd Generation Partnership Project; Technical Specification Group Core Network and Terminals; Policy and Charging Control (PCC); Reference Points (Release 12)," 3GPP, 650 Route des Lucioles, F-06921, Sophia Antipolis Cedex—France, Jul. 2014; Section 4, pp. 17-88.

"ETSI TS 123 401 V9.5.0 (Jun. 2010) Technical Specification: LTE; General Packet Radio Service (GPRS) enhancements for Evolved Universal Terrestrial Radio Access Network (E-UTRAN) access (3GPP TS 23.401 version 9.5.0 Release 9)," ETSI, 650 Route des Lucioles, F-06921, Sophia Antipolis Cedex—France, Jun. 2010; See Section 4, pp. 15-46.

"ETSI TS 123 402 V9.8.0 (Mar. 2011) Technical Specification: Universal Mobile Telecommunications System (UMTS); LTE; Architecture enhancements for non-3GPP accesses (3GPP TS 23.402 version 9.8.0 Release 9)," ETSI, 650 Route des Lucioles, F-06921, Sophia Antipolis Cedex—France, Mar. 2011; See Section 4-6, pp. 14-116.

"Paging Indicator Channel PICH Work in 3G," Teletopix.org, Telecom Techniques Guide, Feb. 13, 2014, 2 pages http://www.teletopix.org/3g-wcdma/paging-indicator-channel-pich-work-in-3g/.

"Paging Channel Selection," UMTS World; first published on or about Jun. 22, 2003; 3 pages http://www.umtsworld.com/technology/paging.html.

Holbrook, H., et al., "Source-Specific-Multicast for IP," Network Working Group RFC 4607, Aug. 2006.

"3GPP TS 36.413 V12.3.0 (Sep. 2014) Technical Specification: 3rd Generation Partnership Project; Technical Specification Group Radio Access Network; Evolved Universal Terrestrial Radio Access Network (E-UTRAN); S1 Application Protocol (S1AP) (Release 12)," [Relevant Sections 9.1.6 and 9.2.3.13 only]; 3rd Generation Partnership Project, Sep. 2014.

"ETSI TS 125 211 V11.5.0 (Jul. 2014) Technical Specification: Universal Mobile Telecommunications System (UMTS); Physical channels and mapping of transport channels onto physical channels (FDD) (3GPP TS 25.211 version 11.5.0 Release 11)," [Relevant Section 7 only]; ETSI, 650 Route des Lucioles, F-06921, Sophia Antipolis Cedex—France, Jul. 2014.

"ETSI TS 123 401 V11.10.0 (Jul. 2014) Technical Specification: LTE; General Packet Radio Service (GPRS) enhancements for Evolved Universal Terrestrial Radio Access Network (E-UTRAN) access (3GPP TS 23.401 version 11.10.0 Release 11)," [Relevant Sections 5.3.1.2 and 5.3.4.3 only]; ETSI, 650 Route des Lucioles, F-06921, Sophia Antipolis Cedex—France, Jul. 2014.

"3GPP TS 23.060 V13.0.0 (Sep. 2014) Technical Specification: 3rd Generation Partnership Project; Technical Specification Group Services and System Aspects; General Packet Radio Service (GPRS); Service description; Stage 2 (Release 13)," [Relevant Sections 5.3.20 and 6.2.3 only]; 3rd Generation Partnership Project; Sep. 2014.

"3GPP TS 23.682 V12.2.0 (Jun. 2014) Technical Specification: 3rd Generation Partnership Project; Technical Specification Group Services and System Aspects; Architecture enhancements to facilitate communications with packet data networks and applications (Release 12)," 3rd Generation Partnership Project; Jun. 2014.

"3GPP TS 22.368 V13.0.0 (Jun. 2014) Technical Specification: 3rd Generation Partnership Project; Technical Specification Group Services and System Aspects; Service requirements for Machine-Type Communications (MTC); Stage 1 (Release 13)," 3rd Generation Partnership Project; Jun. 2014.

"3GPP TS 23.887 V12.0.0 (Dec. 2013) Technical Report: 3rd Generation Partnership Project; Technical Specification Group Services and System Aspects; Study on Machine-Type Communications (MTC) and other mobile data applications communications enhancements (Release 12)," 3rd Generation Partnership Project; Dec. 2013.

"3GPP TS 36.300 V12.3.0 (Sep. 2014) Technical Specification: 3rd Generation Partnership Project; Technical Specification Group Radio Access Network; Evolved Universal Terrestrial Radio Access (E-UTRA) and Evolved Universal Terrestrial Radio Access Network 9E-UTRAN); Overall description; Stage 2 (Release 12)," [Relevant Sections 15 and 23 only]; 3rd Generation Partnership Project; Sep. 2014.

"ETSI TS 136 331 V12.3.0 (Sep. 2014) Technical Specificaton: LTE; Evolved Universal Terrestrial Radio Access (E-UTRA); Radio Resource Control (RRC); Protocol specification (3GPP TS 36.311 version 12.3.0 Release 12)," [Relevant Section 5.3.2 only]; ETSI, 650 Route des Lucioles, F06921, Sophia Antipolis Cedex—France, Sep. 2014.

"3GPP TS 29-272 V12-6-0 (Sep. 2014) Technical Specification: 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release12)," [Relevant Sections 5 and 7.3.1-7.3.21 only]; 3rd Generation Partnership Project; Sep. 2014.

"LTE Quick Reference: CCE Index Calculation," LTE Handbook, Share Technote, http://www.sharetechnote.com/html/Handbook_LTE_CCE+Index.html First published on or about Jul. 8, 2012.

EPO Jan. 29, 2016 Extended Search Report and Written Opinion from European Application Serial No. 15180616.

Gundavelli, M., et al., "Multiple APN Support for Trusted Wireless LAN Access," NETEXT-WG Internet Draft, draft-gundavelli-netext-multiple-apn-pmipv6-01.txt, Feb. 22, 2012; 15 pages.

"3GPP TS 23.402 V12.5.0 (Jun. 2014) Technical Specification: 3rd Generation Partnership Project; Technical Specification Group Services and System Aspects; Architecture enhancements for non-3GPP accesses (Release 12);" 3GPP, 650 Route des Lucioles; F-05921 Sophia-Antipolis Cedex, France; Jun. 2014; 291 pages.

SA-WG2 Meeting #92, S2-123194 (Revision of Sw-122735), Juniper Networks, Barcelona, Spain, Jul. 9-13, 2012; 13 pages.

EPO Mar. 11, 2016 Extended Search Report and Written Opinion from European Application Serial No. 15193713.

"3GPP TS 23.203 V7.3.0 (Jun. 2007) Technical Specification: 3rd Generation Partnership Project; Group Services and System Aspects; Policy and charging control architecture (Release 7)," 3GPP, 650 Route des Lucioles; F-05921 Sophia-Antipolis Cedex, France; Jun. 1, 2007.

PCT Apr. 6, 2016 International Search Report and Written Opinion of the International Searching Authority from International Application No. PCT/US2016/013931.

"3GPP TS 29.213 V13.0.0 (Jan. 5, 2015) Technical Specification: 3rd Generation Partnership Project; Technical Specification Group Core Network and Terminals; Policy and Charging Control signalling flows and Quality of Service (QoS) parameter mapping (Release 13)," 3GPP, 650 Route des Lucioles; F-05921 Sophia-Antipolis Cedex, France; Jan. 5, 2015.

PCT Apr. 6, 2016 International Search Report and Written Opinion of the International Searching Authority from International Application No. PCT/US2016/013934.

3GPP TSG-CT WG3 Meeting #80, C3-150092, 29.213 CR0593, 3GPP Draft; Current Version 13.0.0; Huawei, et al.; Sorrento, Italy Feb. 2-6, 2015.

EPO Apr. 28, 2016 Extended Search Report and Written Opinion from European Application Serial No. 15195895.

EPO Jun. 7, 2016 Extended Search Report and Written Opinion from European Application Serial No. 16150351.

"Cisco ASR 5000 Series Small Cell Gateway," Cisco White Paper, C11-711704-00, Jul. 2012, Cisco Systems, Inc., Printed in USA, © 2012 Cisco and/or its affiliates. All Rights Reserved. 6 pages.

"Cisco EnergyWise Management Suite—Data Sheet," Cisco Systems, Inc., C78-729774-00, Oct. 2013 © 2013 Cisco and/or its affiliates. All Rights Reserved. Printed in USA, 4 pages.

* cited by examiner

SYSTEM AND METHOD FOR PROVIDING POLICY CHARGING AND RULES FUNCTION DISCOVERY IN A NETWORK ENVIRONMENT

TECHNICAL FIELD

This disclosure relates in general to the field of communications and, more particularly, to a system and method for providing policy charging and rules function (PCRF) discovery in a network environment having multiple PCRFs and overlapping Internet protocol (IP) address assignment where a user equipment (UE) can access an Application Function (AF) from anywhere in the network.

BACKGROUND

Networking architectures have grown increasingly complex in communications environments, particularly mobile wireless environments. Mobile communication networks have grown substantially in subscriber base as end users become increasingly connected to mobile wireless environments. As the number of mobile subscribers increases, efficient management of communication resources becomes more critical. In some instances, communication networks can have overlapping Internet protocol (IP) address assignments, say, for example, communication networks in different regions of the United States may re-use IP assignments for user equipment communicating in such networks. In some cases, a DIAMETER routing agent (DRA) can be used to interconnect such networks. However, when a user move between such interconnected networks, there exists a possibility that charging and/or policy information for the user cannot be determined, given that IP addresses can be re-assigned or re-used across different networks. Accordingly, there are significant challenges in managing charging and/or policy information for users transitioning between communication networks having overlapping IP address assignments where a user can access an Application Function (AF) from anywhere in the network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

PCRF Discovery

Figure 1:
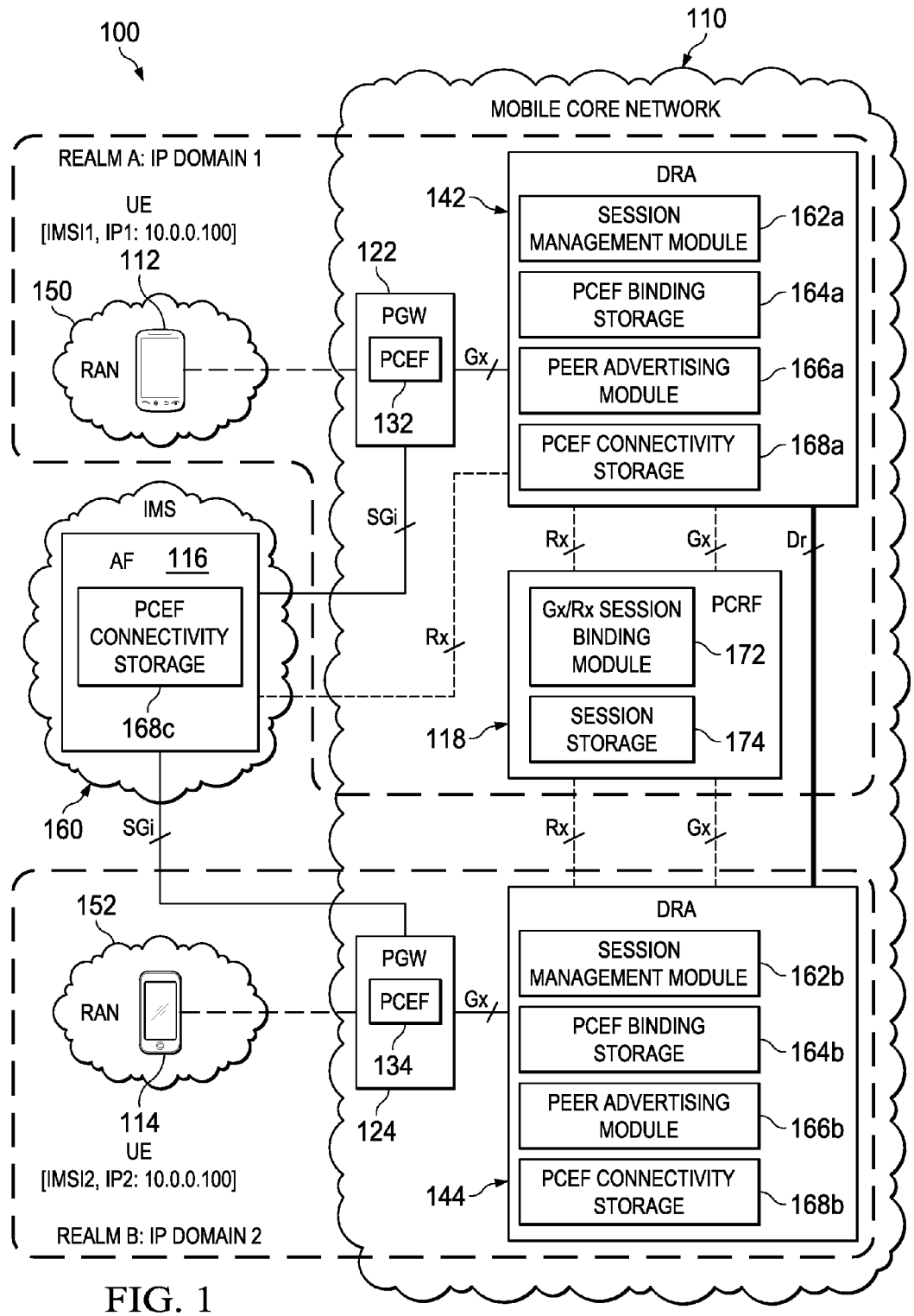
FIG. 1 is a simplified block diagram illustrating a communication system to facilitate providing PCRF discovery in a network environment according to one embodiment of the present disclosure.

A method is provided in one example embodiment and may include establishing a first binding for a first session for a user equipment (UE), wherein the first binding can include, at least in part, policy charging and enforcement function (PCEF) connectivity information for a PCEF associated with a packet data network (PDN) gateway (PGW) hosting the first session for the UE, wherein the first binding can be established by a first DIAMETER routing agent (DRA) serving the PGW in a first IP domain; receiving a request by second DRA in a second IP domain associated with establishing a second session for the UE, wherein the request can include, at least in part, the PCEF-connectivity information; determining a policy charging and rules function (PCRF) serving the first session for the UE based, at least in part, on the PCEF-connectivity information; and binding the second session for the UE with the first session for the UE based, at least in part, on the PCEF-connectivity information.

In some instances, the first session for the UE can be associated with a Gx session for the UE and the second session for the UE can be associated with an Rx session for the UE. In some instances, the PCEF-connectivity information can include an origin-host identifier and an origin-realm identifier for the PGW hosting the first session for the UE and associated with the PCEF. In still other instances, the origin-host identifier can identify the PGW using a fully qualified domain name (FQDN) for the PGW and the realm identifier can identify the first IP domain.

In some cases, the method can include forwarding the request from the second DRA to the first DRA based, at least in part, on the origin-realm identifier included in the PCEF connectivity information. In still other cases, the method can include forwarding the request from the second DRA to a third DRA in a same origin-realm as the first DRA based, at least in part, on the-origin realm identifier included in the PCEF-connectivity information; and forwarding the request from the third DRA to the second DRA based, at least in part, on the origin-host identifier and a UE identifier included in the PCEF-connectivity information. In still other cases, the method can include receiving, by the first DRA, a request from the PCEF associated with the PGW served by the first DRA for a PCRF allocation for the first session for the UE; and selecting, by the first DRA, the PCRF to serve the first session for the UE.

In still other instances, the first binding can further include, at least one of: an identity of the UE; an IP address assigned to the UE for the first session; and an identifier of the PCRF serving the first session for the UE. In still other instances, the determining can be performed by the first DRA in the first IP domain based on the first binding.

DRA PCEF-Connectivity Exchanges

A method is provided in another example embodiment and may include exchanging PCEF-connectivity information between a plurality of DRAs interconnected via a plurality of IP domains; and maintaining, for each of the plurality of DRAs, PCEF-connectivity information for one or more peer DRAs to which each of the plurality of DRAs is interconnected. In some instances, the PCEF-connectivity information maintained for a particular DRA can include at least one of: PCEF-connectivity information for one or more peer DRAs to which the particular DRA is interconnected in a same IP domain as the particular DRA; PCEF-connectivity information for one or more peer DRAs to which the particular DRA is interconnected in a different IP domain as the particular DRA; and PCEF-connectivity information for one or more DRA load balancers to which the particular DRA is interconnected.

In still other instances, the PCEF-connectivity information maintained for a particular DRA can be associated with at least two of the plurality of IP domains having overlapping IP address assignments. In still other instances, the PCEF-connectivity information maintained for a particular DRA can include, at least in part: a corresponding origin-host identifier and a corresponding origin-realm identifier for each of a corresponding PGW served by the particular DRA, wherein each corresponding PGW is associated with a corresponding PCEF. In some instances, each corresponding origin-host identifier can identify each corresponding PGW served by the DRA using a corresponding fully qualified domain name (FQDN) for each corresponding PGW and each corresponding origin-realm identifier can identify a corresponding IP domain for each corresponding PGW.

In some cases, the method can include configuring a particular DRA with particular PCEF connectivity information, wherein exchanging PCEF connectivity information for the particular DRA includes advertising a particular message over a 'Dr' interface from the particular DRA including PCEF connectivity information for each of one or more PGWs served by the particular DRA. In still other cases, the method can include receiving, by a particular DRA, a request for a PCRF allocation from a PCEF associated with a PGW served by the particular DRA, wherein exchanging PCEF connectivity information for the particular DRA can include advertising, upon receiving the request, a particular message from the particular DRA including PCEF-connectivity information for the PGW.

Example Embodiments

Turning to FIG. 1, FIG. 1 is a simplified block diagram illustrating a communication system 100 to facilitate providing PCRF discovery in a network environment according to one embodiment of the present disclosure. This particular configuration may be tied to the 3rd Generation Partnership Project (3GPP) Evolved Packet System (EPS) architecture, also sometimes referred to as the Long Term Evolution (LTE) EPS architecture. Alternatively, the depicted architecture may be applicable to other environments equally.

The example architecture of FIG. 1 includes users operating user equipment 112, 114, a mobile core network 110, which can be spread across multiple realms, Realm A and Realm B, each associated with a respective Internet protocol (IP) domain, IP domain 1 and IP domain 2. For IP domain 1, mobile core network 110 can include a policy and charging rules function (PCRF) 118, a packet data network (PDN) gateway (PGW) 122, which can include a policy and charging enforcement function (PCEF) 132, a first DIAMETER routing agent (DRA) 142 and a first radio access network (RAN) 150. FIG. 1 also includes an IP multimedia subsystem (IMS) 160, which may include an application function (AF) 116. First DRA 142 can include a session management module 162a, PCEF binding storage 164a, a peer advertising module 166a and PCEF connectivity storage 168a. PCRF 118 can include a Gx/Rx session binding module 172 and session storage 174. AF 116 can include PCEF connectivity storage 168c. For IP domain 2, mobile core network 110 can include a PGW 124, including a PCEF 134, a second DRA 144 and a second RAN 152. Second DRA 144 can include a session management module 162b, PCEF binding storage 164b, a peer advertising module 166b and PCEF connectivity storage 168a.

Note use of the terms 'first, 'second', 'third', 'fourth', etc. as used herein are provided merely for distinguishing between multiple network elements of a same type within communication system 100 and are not meant to denote an order or sequence of elements or components. Note for various embodiments outlined herein, any corresponding PGW and PCEF (e.g., PGW 122 and PCEF 132; PGW 124 and PCEF 134) can be referred to collectively as 'PGW/PCEF', as various operations, functions and/or activities discussed for various embodiments described herein can be performed with both network elements operating in conjunction with each other.

RAN 150 is a communications interface between UE 112 and PGW 122/PCEF 132. RAN 152 is a communications interface between UE 114 and PGW 124/PCEF 134. Thus, RANs 150, 152 may provide one or more coverage areas for servicing multiple end users and for managing their associated connectivity. The communications interface provided by respective RANs 150, 152 may allow data to be exchanged between an end user and any number of selected elements within communication system 100. For example, RAN 150 may facilitate the delivery of a request packet generated by a given UE (e.g., UE 112) and the reception of information sought by an end user in IP domain 1. Similarly, RAN 152 may facilitate the delivery of a request packet generated by a given UE (e.g., UE 114) and the reception of information sought by an end user in IP domain 2.

In general, access networks (e.g., RAN 150, 152) may operate to provide 3GPP access networks including legacy access networks such as Global System for Mobile communications (GSM) Enhanced Data rates for GSM Evolution (EDGE) Radio Access Network (GERAN), Universal Mobile Telecommunications System (UMTS) Terrestrial Radio Access Network (UTRAN), generally referred to as 3G, and/or LTE access networks such as Evolved UTRAN (EUTRAN), generally referred to as 4G/LTE/LTE-Advanced (LTE-A), or they may operate to provide non-3GPP IP access networks such as digital subscriber line (DSL), Cable, WLAN (e.g., WiMAX, WiFi) or the Internet.

In various embodiments, depending on deployment, RAN 150, 152 can include radio interface equipment to provide macro and or small cell mobile/cellular coverage for UE 112, 114. In general, Node Bs (NodeBs), Home Node Bs (HNBs), and/or Radio Network Controllers (RNCs) can be deployed to provide coverage for 3G macro and/or small cell access networks. In general, evolved Node Bs (eNodeBs) and/or Home eNodeBs (HeNBs) can be deployed to provide coverage for 4G/LTE/LTE-A macro and/or small cell access networks. In general, small cell networks differ from macro networks in that small cell networks are typically comprised of multiple small cell access points, which can provide proximate coverage to users in an environment in which macro network coverage may be limited or interfered (e.g., within a building, structure, facility, etc.). Other suitable types of communications interfaces may be used for any appropriate network design and, further, be based on specific communications architectures in accordance with particular needs.

In certain embodiments, communication between RAN 150, 152 and the mobile core network elements in their respective IP domains can be facilitated via other network elements, such as, for example one or more Mobility Management Entities (MMEs), one or more serving gateways (SGWs), one or more serving general packet radio service (GPRS) support nodes (SGSNs), one or more gateway GPRS support nodes (GGSN), one or more Authentication, Authorization and Accounting (AAA) elements, a Home Subscriber Service (HSS)/Home Location Register (HLR), etc. as generally provided in 3GPP technical specification (TS) 23.401, TS 29.061, etc. These network elements are not shown in FIG. 1 in order to illustrate other features of communication system 100. Although only one PCRF is shown in FIG. 1, it should be understood that each IP domain can include one or more PCRFs.

In certain embodiments, mobile core network 110 and/or IMS 160 can represent a series of points or nodes of interconnected communication paths (wired or wireless) for receiving and transmitting packets of information that propagate through communication system 100. In various embodiments, mobile core network 110 can be associated with and/or provided by a single network operator or service provider and/or multiple network operators or service providers. Mobile core network 110 and/or IMS 160 may offer communicative interfaces between UE 112 and/or 114 and selected nodes or elements in the network, and may be any local area network (LAN), wireless local area network (WLAN), metropolitan area network (MAN), wide area network (WAN), virtual private network (VPN), Intranet, extranet, or any other appropriate architecture or system that facilitates communications in a network environment. Communication system 100 may implement a user datagram protocol (UDP)/Internet protocol (UDP/IP) connection and use a transmission control protocol (TCP/IP) communication language protocol in particular embodiments of the present disclosure. However, communication network may alternatively implement any other suitable communication protocol for transmitting and receiving data packets within communication system 100.

Also provided in the architecture of FIG. 1 are a series of interfaces, which can offer mobility, policy control, Authentication, Authorization and Accounting (AAA) functions and/or charging activities (offline and online) for various network elements. For example, interfaces can be used to exchange point of attachment, location, and/or access data for one or more end users, for example, users operating UE 112, 114. Resource information, accounting information, location information, access network information, network address translation (NAT) control, etc. can be exchanged using a remote authentication dial in user service (RADIUS) protocol or any other suitable protocol where appropriate. Other protocols that can be used in communication system 100 can include DIAMETER protocol, service gateway interface (SGi), terminal access controller access-control system (TACACS), TACACS+, etc.

Generally, interfaces, such as, for example SGi, Rx and Gx can represent reference points for certain communication protocols as generally provided in 3GPP TS 23.203, TS 29.212 and TS 29.214. As shown in FIG. 1, an SGi-based interface may be provisioned between PGW 122/PCEF 132 and AF 116 and another SGi-based interface may be provisioned between PGW 124/PCEF 134 and AF 116. A DIAMETER-based Gx interface can be provisioned between PGW 22/PCEF 132. A DIAMETER-based Rx interface may be provisioned between AF 116 and DRA 142. Another DIAMETER-based Rx interface and another DIAMETER-based Gx interface can be provisioned between DRA 142 and PCRF 118. Another DIAMETER-based Rx interface and another DIAMETER-based Gx interface can be provisioned between DRA 144 and PCRF 118. Another DIAMETER-based Gx interface can be provisioned between PGW 124/PCEF 134 and DRA 144. Communication system 100 can additionally include a new DRA-based interface, 'Dr', which may be provisioned to communicate DRA capability information between one or more DRAs provided in communication system 100.

As shown in FIG. 1, UE 112 can be associated with an identity, such as, for example, a first International Mobile Subscriber Identity (IMSI) [shown in FIG. 1 as IMSI1], which may be associated with a subscriber operating UE 112. For example, the IMSI can be stored on a Subscriber Identity Module (SIM) card housed within UE 112. UE 112 can be assigned an example IP address IP1: 10.0.0.100 for an IP connectivity access network (IP-CAN) session established for UE 112 within IP domain 1. UE 114 can be associated with an identity, such as, for example, a second IMSI [shown in FIG. 1 as IMSI2], which may be associated with a subscriber operating UE 114 (e.g., stored on a SIM card housed within UE 114). UE 114 can be assigned an IP address IP2: 10.0.0.100 for an IP-CAN session established for UE 114 within IP domain 2. Once an access session is established for UE 112, 114, the respective users for UE 112, 114 can register for application services as well, without additional authentication requirements. In various embodiments, UE IP addresses for UE 112, 114 can be assigned using dynamic host configuration protocol (DHCP), Stateless Address Auto-configuration, default bearer activation, etc., or any suitable variation thereof as prescribed in 3GPP TS 29.061.

In various embodiments, UE 112, 114 can be associated with users, employees, clients, customers, etc. wishing to initiate a flow in communication system 100 via some network. The terms 'user equipment', 'mobile node', 'end user', 'user', and 'subscriber' are inclusive of devices used to initiate a communication, such as a computer, a personal digital assistant (PDA), a laptop or electronic notebook, a cellular telephone, an i-Phone™, iPad™, a Google Droid™ phone, an IP phone, or any other device, component, element, or object capable of initiating voice, audio, video, media, or data exchanges within communication system 100. UE 112, 114 may also be inclusive of a suitable interface to a human user such as a microphone, a display, a keyboard, or other terminal equipment.

UE 112, 114 may also be any device that seeks to initiate a communication on behalf of another entity or element such as a program, a database, or any other component, device, element, or object capable of initiating an exchange within communication system 100. Data, as used herein in this document, refers to any type of numeric, voice, video, media, or script data, or any type of source or object code, or any other suitable information in any appropriate format that may be communicated from one point to another. In certain embodiments, UE 112, 114 may have a bundled subscription for network access and application services (e.g., voice), etc.

PCRF 118 may aggregate information to and from mobile core network 110, operational support systems, such as IMS 160, and other sources (such as portals) in real time, supporting the creation of policy and charging rules and then automatically making policy and charging decisions for each subscriber. PCRF 118 can be configured to use user subscription information as a basis for the policy and charging control decisions. The subscription information may apply for both session-based and non-session based services. PCRF 118 may provision policy charging and control (PCC) rules for PGW 122/PCEF 132 and/or PGW 124/PCEF 134. Additionally, PCRF 118 may determine PCC rules based on an application or service described to the PCRF, for example, from AF 116, which can be provisioned by a network operator within IMS 160. In various embodiments, PCRF 118 may communicate PCC rules to PGW 122/PCEF 132 via DRA 142 and/or PGW 124/PCEF 134 via DRA 144. Internet Engineering Task Force (IETF) has defined two DRA modes: Proxy DRA and re-direct DRA. In the proxy mode, all messages are proxied via a given DRA. In the re-direct mode, only a first message (e.g., a Gx session establishment) is proxied via a given DRA and subsequent messages are sent directly between a given PCRF and PCEF. Embodiments of the present disclosure are operable with both IETF modes. PGW 122 and PCEF 132 may serve as policy and charging enforcement points to manage QoS, online/offline flow-based charging, data generation, deep-packet inspection and intercept within IP domain 1. Similarly, PGW 124 and PCEF 134 may serve as policy and charging enforcement points to manage QoS, online/offline flow-based charging, data generation, deep-packet inspection and intercept within IP domain 2 and may receive PCC rules from PCRF 118 via DRA 144.

Generally, AF 116 can describe applications/services to PCRF 118 (e.g., via Information Elements (IEs) such as, for example, media time and media description, priority, uplink/downlink requirements, application identifier, etc.) that may require dynamic policy and/or charging control for UE 112 and/or UE 114. The dynamic policy and/or charging controls may include, but not be limited to, setting quality of service (QoS) levels and/or gating. In certain embodiments, various network access and application services can be provided for UE 112 and/or UE 114 by establishing a corresponding session for UE 112 and/or 114 via AF 116 within IMS 160. In certain embodiments, IMS 160 may provide, among other things, voice over LTE (VoLTE) capabilities for UE 112 and/or UE 114 via one or more call session control functions (CSCFs), which may be referred to collectively as Session Initiation Protocol (SIP) servers. In certain embodiments, AF 116 can be deployed as a proxy CSCF (P-CSCF), which may serve as an entry node into IMS 160 and may provide proxy services for a given UE attempting to establish an IMS-based session (e.g., establish a VoLTE call). In various embodiments, other network elements can be provided within IMS 160 to service an IMS-based UE session, such as, for example, an interrogating CSCF (I-CSCF) and a serving CSCF (S-CSCF).

First DRA 142 and second DRA 144 can be deployed in communication system 100 to replace point-to-point full mesh connectivity between PCC network elements (e.g., AF 116 and PCRF 118) and may provide load distribution for charging and control functions. In general, DRA 142, 144 selects a PCRF for each device session and can proxy traffic on a per-DIAMETER session basis for each user session. In essence, DRA 142, 144 can provide a proxy for communicating policy and charging information between multiple IP domains in communication system 100. In various embodiments, communication system 100 can be spread across different regions of a continent (e.g., regions of the United States) or across continents (e.g., spread across the United States and Europe).

Before detailing some of the operational aspects of FIG. 1, it is important to understand common characteristics of PCRF discovery and session binding as generally provided in commercial architectures. The following foundation is offered earnestly for teaching purposes only and, therefore should not be construed in any way to limit the broad teachings of the present disclosure. 3GPP TS 23.203 and TS 29.213 specify requirements and procedures for PCRF discovery by DIAMETER clients, such as, for example, an AF or traffic detection function (TDF) using a single DRA and multiple PCRFs in a DIAMETER realm. 3GPP TS 29.214 includes requirements related to AF discovery of a PCRF in networks where the AF connects to PGWs in multiple IP domains via a single DRA and multiple PCRFs in a DIAMETER realm. AF and/or TDF discovery of a (same) PCRF already selected for the Gx session created for an IP-CAN session for a given UE is essential for binding with an Rx session for the UE, which can be created via the AF. Gx-to-Rx session binding (also denoted 'Gx/Rx' session binding herein) is needed to provision PCC rules for UE sessions. As IP addresses can be reallocated across different domains (e.g., different realms) the IP address of a given UE is insufficient to identify the Gx subscriber session for the UE at the PCRF, thus binding of the. For such networks including multiple realms, 3GPP TS 29.214 prescribes that the AF can be configured with an IP-DOMAIN-ID attribute value pair (AVP) that indicates origin-host identity information for one or more origin-host (PGW/PCEF) that the AF may serve across multiple realms. The AF can be configured with an IP-DOMAIN-ID for each physical interface to a corresponding PGW. The IP-DOMAIN-ID can be used to help the PCRF derive the identity of the PGW/PCEF hosting the Gx IP-CAN session for a given UE in order to bind the Gx IP-CAN session for the UE with an Rx session for the UE created via the AF. The PCRF can be configured with a mapping of IP-DOMAIN-ID to a corresponding origin-host to bind the sessions.

For example, during IP-CAN session creation, the PGW/PCEF to which a given UE has an established connection can communicate a Gx initial Credit Control Request (CCR) message (typically denoted as 'CCR-I') to the PCRF, which includes an origin-host AVP that identifies the endpoint that originated the message (e.g., the PGW associated with the PCEF). As noted, the AF can be configured with an IP-DOMAIN-ID for each origin-host it may serve. When seeking to establish an Rx session for a given UE, the AF can include the IP-DOMAIN-ID for an origin-host in an Authorization and Authentication Request (AAR) message communicated to the PCRF. The IP-DOMAIN-ID may correspond to the identity of the origin-host (e.g., the PGW) connected to the UE from which the request for an Rx session originated.

In receiving, a request from the AF to create an Rx session for the UE, the PCRF can use the configured mapping between IP-DOMAIN-IDs and origin-hosts to determine the PCEF enforcing PCC rules for the UE. However, the IP-DOMAIN-ID is useful in session binding only if the origin-host of the Gx CCR-I is not modified by intermediate DIAMETER proxies (e.g., DRAs) deployed between the PCEF and the PCRF. However, in current deployments including multiple DRAs interconnected across multiple realms, origin-host information for CCRs and for AARs, DRAs will update the origin-host in providing a proxy for such messages; thus, interfering with the ability of a given PCRF to determine a Gx session for a particular UE in order to perform Gx/Rx session binding. Moreover, the IP-DOMAIN-ID is not currently used to determine a PCRF serving a particular Gx IP-CAN session for a given UE. In current deployments including multiple DRAs interconnected across multiple IP domains, DRAs in one IP domain may be unable to locate a PCRF serving a particular Gx IP-CAN session for a given UE originated from another IP domain; thus, thus leading to an Rx session being rejected for a particular UE.

In accordance with various embodiments described herein, communication system 100 is configured to address these issues (and others) in offering a system and method for providing PCRF discovery in a network environment. In at least one embodiment, the method described herein can be executed by one or more hardware processors for a DRA (e.g., DRA 142, 144) and/or a PCRF (e.g., PCRF 118). Generally, the system and method provided by communication system 100 may enable each DRA in the network to advertise an origin-host and origin-realm combination for each of one or more PGW/PCEFs served in each of one or more realms to all peer DRAs to which they may be interconnected across the network. Note an origin-host, origin-realm combination can also be referred to herein as an '{origin-host, origin-realm}' combination. Further, communication system 100 may enable each interconnected peer DRA to provide DIAMETER routing, which can provide for forwarding a client's request for an Rx session for a subscriber (e.g., an AAR from AF 116) to a particular DRA in the network servicing the subscriber's Gx IP-CAN session. The particular DRA can identify a corresponding PCRF associated with the subscriber's Gx IP-CAN session and can proxy the request to the PCRF, which may then bind the subscriber's Gx session to the subscriber's Rx session based on identifying information for the subscriber contained in the request (e.g., UE subscription identifier (ID), UE IP address, etc. In this manner, the system and method may provide Gx/Rx session binding for a subscriber.

In certain embodiments, {origin-host, origin-realm} advertising for DRA 142 can be performed via peer advertising module 166a and {origin-host, origin-realm} advertising for DRA 144 can be performed via peer advertising module 166b. In various embodiments, {origin-host, origin-realm} information for each PGW/PCEF served by a corresponding DRA as well as {origin-host, origin-realm} information for other interconnected DRAs can be stored via PCEF connectivity storage 168a for DRA 142 and PCEF connectivity storage 168b via DRA 144.

As noted previously, each DRA 142, 144 can be interconnected via the new reference point 'Dr'. In certain embodiments, each DRA in the system can advertise {origin-host, origin realm} information for each PGW/PCEF to which it is connected to across each of one or more realms to one or other DRAs it may discover in the system through an exchange of one or more Capabilities Exchange Request (CER) messages. In certain embodiments, DRA discovery can be performed as prescribed in Request For Comments (RFC) 3588, defined by the Internet Engineering Task Force (IETF). In certain embodiments, each DRA can maintain (e.g., store, update, etc.) PCEF-connectivity information received from one or more peer DRAs in communication system 100.

In certain embodiments, the system and method provided by communication system 100 can include enhancing a CER message to include a new PCEF-connectivity AVP. The PCEF-connectivity AVP can include an origin-host, origin-realm combination, which can identify a given PGW/PCEF to which a given DRA is connected. In various embodiments, the PCEF-connectivity origin-host can be set to a fully qualified domain name (FQDN) of a corresponding PGW associated with a corresponding PCEF and the PCEF-connectivity origin-domain can be set to an IP domain including the corresponding PGW. For FIG. 1, for example, the PCEF-connectivity origin-domain for PGW 122/PCEF 132 can be set to the FQDN of PGW 122 and the origin-realm can be set to IP domain 1. Similarly, the PCEF-connectivity origin-domain for PGW 124/PCEF 134 can be set to the FQDN of PGW 124 and the origin-realm can be set to IP domain 2.

An example PCEF connectivity AVP is shown below in TABLE 1 and an enhanced CER message is shown below in TABLE 2.

TABLE 1

PCEF-CONNECTIVITY::=<AVP HEADER: xxxx>
   [ORIGIN-HOST]
   [ORIGIN-REALM]
   *[AVP]

TABLE 2

<CER> ::= < Diameter Header: 257, REQ >
   { Origin-Host }
   { Origin-Realm }
  1*{ Host-IP-Address }
   { Vendor-Id }
   { Product-Name }
  [ Origin-State-Id]
 * [ Supported-Vendor-Id ]
 * [ Auth-Application-Id ]
 * [ Inband-Security-Id ]
 * [ Acct-Application-Id ]
 * [ Vendor-Specific-Application-Id ]
 *[ PCEF-Connectivity]
  [ Firmware-Revision ]
 * [ AVP ]

During operation, in various embodiments, one or more CER message(s) can be advertised by DRA 142, 144 using a configuration-based option or a request-based option to communicate PCEF-connectivity to other interconnected DRAs in the system. In various embodiments, PCEF-connectivity information, for PCEF-connectivity for a given DRA and/or for PCEF-connectivity for other interconnected DRAs can be stored in PCEF connectivity storage 168a, 168b. In certain embodiments for the configuration-based option, a given DRA may advertise a single CER message to any other interconnected DRA including as many PCEF-connectivity AVPs (e.g., as many {origin-host, origin-realm} combinations) as there are origin-realms including PGW/PCEFs connected to the given DRA. In various embodiments, DRAs can be configured by a network operator, service provider, combination thereof or the like to include one or more origin-realm(s) and one or more origin-host(s) per realm for each of one or more PCEF-connectivity AVP(s).

In certain embodiments for the request-based option, a CER message including a particular PCEF-connectivity {origin-host, origin-realm} combination can be advertised by a corresponding DRA other interconnected DRAs when a first request for PCRF allocation is received by the DRA from a corresponding PCEF in a Gx CCR-I. Thus, the DRA can send multiple CER messages to other interconnected DRAs, one CER message corresponding to each request received, which may result in a gradual build-up of a connectivity database at each DRA (e.g., within PCEF connectivity storage 168a, 168b for respective DRAs 142, 144). The request-based option may provide for minimum signaling (e.g., once per PGW/PCEF origin-host) as compared to the configuration-based option. In certain embodiments, the request-based option can be enhanced to advertise an update to interconnected DRAs when all sessions for a given PGW/PCEF may be terminated (e.g., removing origin-host, origin realm information for the given PGW/PCEF when all sessions may be terminated at the PGW/PCEF). However, this may be a rare event.

It should be noted that exchanging PCEF-connectivity information using CER messages is only one alternative that can be used to exchange PCEF-connectivity information between interconnected DRAs over the 'Dr' interface. In certain embodiments, one or more Profile Update Requests (PURs) can also be used to exchange PCEF-connectivity information between interconnected DRAs. Accordingly, any other mechanisms can be used to exchange PCEF-connectivity information between interconnected DRAs and are clearly within the scope of the present disclosure.

Exchanging PCEF-connectivity information between interconnected peer DRAs (e.g., DRA 142, 144) using either the configuration-based option or the request-based option may enable PCRF discovery to be performed for a given UE (e.g., UE 114) using a sequence of operations beginning with Gx IP-CAN session establishment for UE 114. During operation, for example, UE 114 may seek to establish a connection with PGW 124/PCEF 134 via RAN 152. In establishing the connection, PGW 124/PCEF 134 may provision a PCEF-connectivity information element (IE) including the origin-host, origin-realm identification information PGW 124/PCEF 134. In certain embodiments, PGW 124 may communicate the PCEF-connectivity IE to UE 114 at approximately the same time it provisions a P-CSCF IP address (e.g., an IP address of AF 116) to the UE per 3GPP TS 29.061. An example PCEF-connectivity IE is shown below in TABLE 3.

TABLE 3

PCEF-CONNECTIVITY IE:
[ORIGIN-HOST]
[ORIGIN-REALM]

PGW 124/PCEF 134 may initiate Gx session establishment for UE 114 by communicating a CCR-I to DRA 144 including the origin-host information of PGW 124 (e.g. FQDN of PGW 124), the origin-realm information of PGW 124 (e.g., IP domain 2), the subscription ID of UE 114 (e.g., IMSI2), the access point name (APN) for the session and the UE 114 IP address (e.g., 10.0.0.100). DRA 144 may select a PCRF (e.g., PCRF 118) to serve the session for UE 114 and may create a first {origin-host, origin-realm} binding for the PCRF selection for UE 114 associated the origin-host and origin-realm information for PGW 124/134 with the UE 114 subscription ID, APN, UE 114 IP address and PCRF 118 IP address. In certain embodiments, the first binding for UE 114 can be stored in PCEF binding storage 164b. In certain embodiments, a DRA can select a PCRF to serve a UE session based on configuration, load-balancing algorithms, combinations thereof or the like.

DRA 144 may then proxy the CCR-I message to PCRF 118 including the origin-host and origin-realm information for PGW 124/PCEF 134, the UE subscription ID, APN and UE IP address and PCRF 118 may respond with a credit control answer (CCA) to DRA 144. In various embodiments, PCRF 118 may store Gx session information for UE 114 in session storage 174. DRA 144 may proxy the CCA to PGW 124/PCEF 134 which may communicate a create session response to UE 114 to indicate establishment of the Gx IP-CAN session.

At any time, UE 114 may initiate an SIP session (e.g., an Rx session) with AF 116 (e.g., via IMS 160) and may communicate an SIP invite to AF 116 including another IE, referred herein as a P-PCEF-connectivity IE, which may include the same origin-host, origin-realm information communicated to UE 114 in the PCEF-connectivity IE from PGW 124/PCEF 134. In certain embodiments, the P-PCEF-connectivity IE can be defined as an SIP extension for IMS. In certain embodiments, AF 116 may store the PCEF-connectivity information for PGW 124/PCEF 134 contained in the P-PCEF-connectivity IE in a DIAMETER-based format in PCEF connectivity storage 168c. In certain embodiments, AF 116 may store the PCEF-connectivity IE in a PCEF-connectivity AVP as shown in TABLE 1. In certain embodiments, AF 116 (e.g., PCEF connectivity storage 168c for AF 116) can be manually configured with PGW/PCEF origin-host, origin-realm information for each PGW/PCEF to which it connects. However, manual configuration is labor intensive and may result in having to configure all possible PCEF in the network given UE mobility. As discussed herein, embodiments of the present disclosure provide a system and method to automate provisioning and/or communicating of origin-host, origin-realm information within communication system 10, which can enable a UE to access the AF from anywhere (e.g., any PCEF) in the network and can enable to AF to discover the PCRF selected for the Gx session for the UE.

During operation, AF 116 can request authorization for quality of service (QoS) resources for UE 114 via an AAR message communicated to DRA 142 to which it is connected. In various embodiments, the AAR message can include the origin-host and origin-realm identifying information for AF 116 (as AF 116 is the originator of the AAR message), destination-host and destination-realm identifying information (e.g., host/realm information for DRA 142), the PCEF-connectivity AVP including the {origin-host, origin-realm} information for PGW 124/PCEF 134, the IP address for UE 114 and the subscription ID for UE 114.

DRA 142, via session management module 162a, can perform a look-up on the PCEF-connectivity AVP received in the AAR message against PCEF-connectivity information stored in PCEF connectivity storage 168a. Recall, PCEF-connectivity information can be exchanged between interconnected DRAs 142, 144 via the configuration-based option or the request-based option in various embodiments, as discussed above. It is assumed for purposes of the present operational example that PCEF-connectivity information for PGW 124/PCEF 134 has been previously stored in PCEF connectivity storage 168a using one of these options.

Based on the look-up, DRA 142 can determine a realm (e.g., IP domain 2) and corresponding DRA associated thereto (e.g., DRA 144), which may be serving the Gx session for UE 114. DRA 142 may forward the AAR message (including the PCEF-connectivity AVP) to DRA 144. In various embodiments, communication system 100 can include multiple, load balanced DRAs in a given realm. In such embodiments, PCEF-connectivity origin-host, origin-realm information stored in a given peer DRA may be insufficient to correctly identify the correct one of multiple load balanced DRAs in the realm that may be servicing the Gx IP-CAN session for a given UE. Thus, the look-up that a DRA may perform via a received AAR message may merely be used by the DRA to identify a realm and a corresponding DRA associated thereto that might service the Gx IP-CAN session for a given UE. Determining an appropriate DRA amongst a plurality of load balanced DRAs to which to forward the message within a given realm can be determined by the DRA receiving the message from a peer DRA in another realm. A further discussion of operations for load balanced DRAs is provided in more detail later in this Specification.

Returning to the present example, upon receiving the AAR message, DRA 144 can perform a look-up, via session management module 162a, on PCEF binding storage 164b to match the origin-host, origin realm information contained in the PCEF-connectivity AVP and the UE 114 information contained in the AAR message to the {origin-host, origin-realm} binding for UE 114 to identify PCRF 118 associated with the Gx session for UE 114.

Based on the look-up and identification of PCRF 118, DRA 144 may communicate the AAR message to PCRF 118 including, but not limited to, the origin-host, origin-realm identifying information of AF 116, destination-host and destination-realm identifying information (e.g., host/realm information for DRA 142), the PCEF-connectivity AVP including the origin-host, origin-realm information for PGW 124/PCEF 134, the IP address for UE 114 and the subscription ID for UE 114. PCRF 118, via Gx/Rx session binding module 172, can perform a look-up on session storage 174 using the origin-host, origin-realm information contained in the PCEF-connectivity AVP and the UE identification information in the AAR message against the Gx IP-CAN session information stored for UE 114 (e.g., identifying PGW 124/PCEF 134 for the Gx session) to identify the Gx session for UE 114 and bind the Rx and Gx sessions for UE 114.

In essence, the system and method provided by communication system 100 can provide efficient two-step AF discovery of a PCRF anywhere in the network using interconnected DRAs having advertised/exchanged PCEF-connectivity information. In certain embodiments, a first step can include Gx CCR-I proxying and PCRF selection by a first DRA connected to a given PGW/PCEF hosting a Gx IP-CAN session for a given UE and a second step can include AF PCRF discovery via another DRA interconnected locating the first DRA in the network and performing Rx/Gx binding via the discovered PCRF. In certain embodiments, the system and method provided by communication system 100 is dynamic in that it enables a given UE to access an AF from anywhere in the network and further enables the AF to discover the PCRF that serves the UE's connection anywhere in the network.

In certain embodiments, the system and method provided by communication system 100 can provide one or more advantages including, but not limited to: advertisement of origin-host, origin-realm PCEF-connectivity can enable exposure of each DRA's connectivity to a network of interconnected DRAs; an efficient, light-weight protocol can be used for the advertisement of origin-host, origin-realm PCEF-connectivity in a network of interconnected DRAs; enables a UE in a network of overlapping IP domains to connect to an AF located anywhere in the network; and/or providing UE session visibility at a particular DRA connected to a PGW/PCEF hosting the UE session can provide a provide a mechanism for partitioning a network such that a DRA only needs to know a subset of UE sessions in the system. For example, a voice call for a given UE can be resolved to a particular DRA and a particular PCRF serving an IP-CAN session for the UE based on PCEF-connectivity information that can be exchanged between the PGW/PCEF and the UE and that can be exchanged for the PGW/PCEF between interconnected DRAs. In essence, a PCRF configuring policy and charging information for a UE can be discovered using PCEF-connectivity information without needing other session information for the UE.

Figure 2:
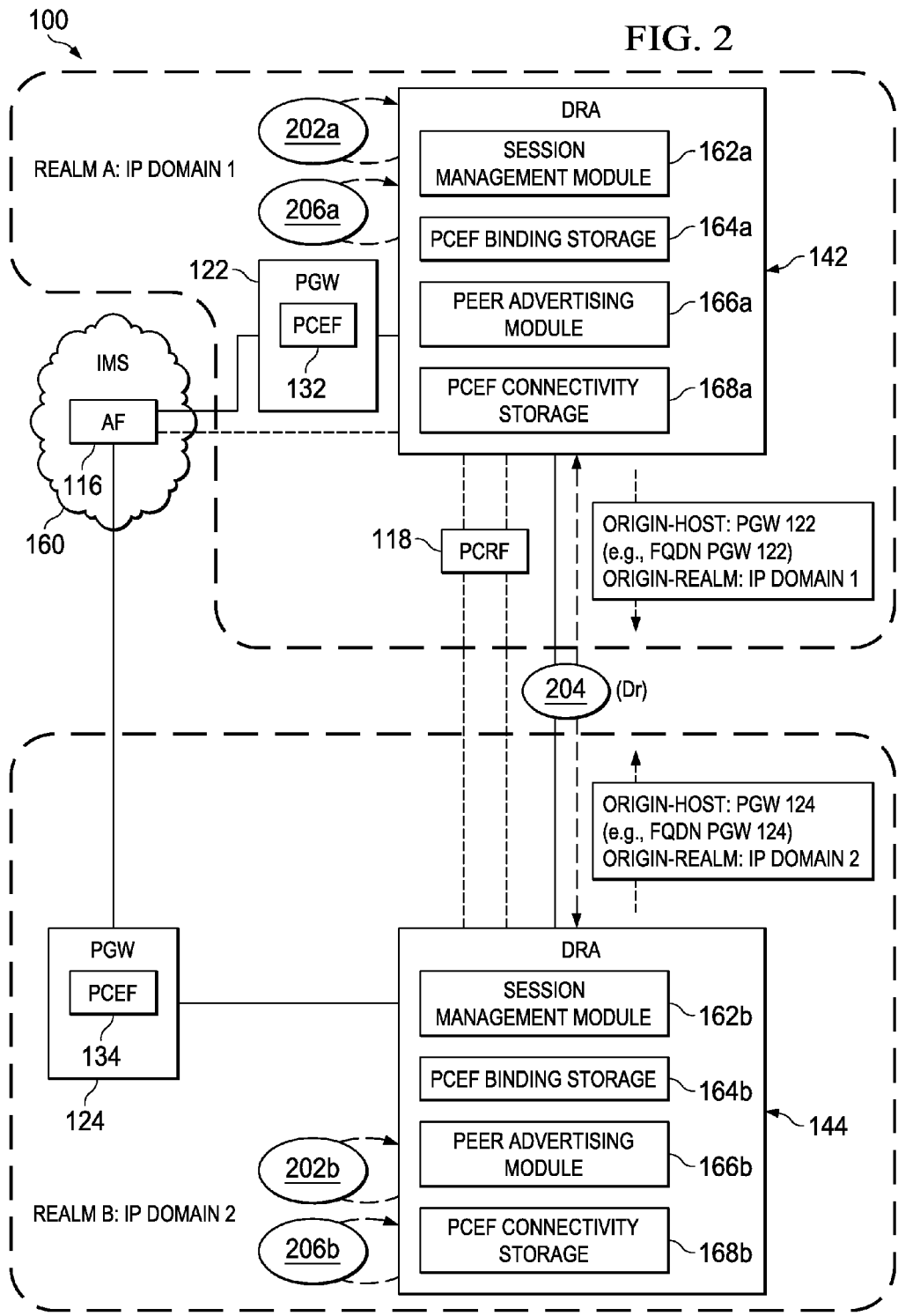
FIGS. 2-3 are simplified block diagrams illustrating example details associated with interconnected DIAMETER routing agents (DRAs) in a network environment in accordance with various potential embodiments of the communication system
Figure 3:
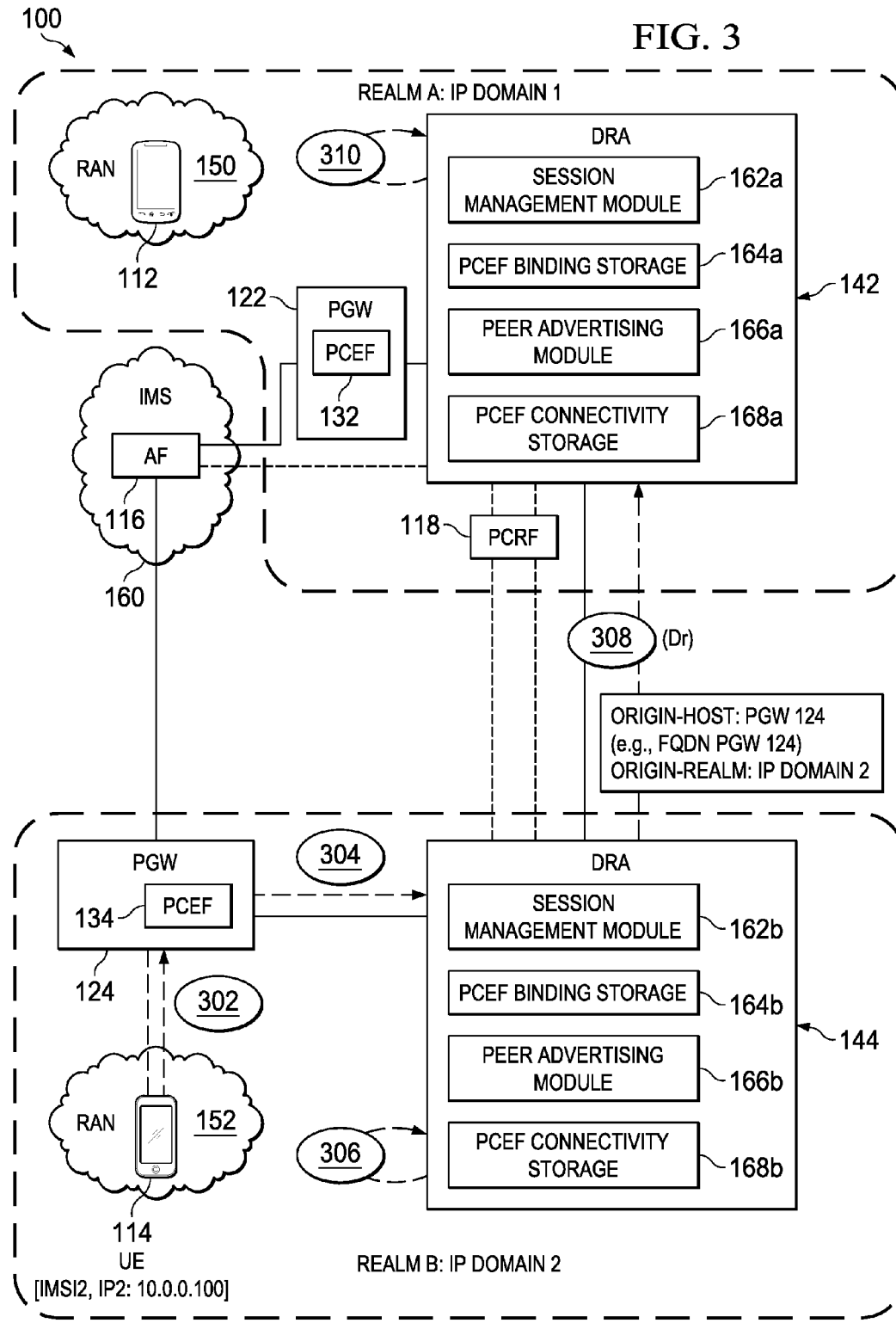

Turning to FIGS. 2-3, FIGS. 2-3 are simplified block diagrams illustrating example details associated with exchanging PCEF-connectivity information between interconnected DRAs in a network environment in accordance with various embodiments of communication system 100. In particular, FIG. 2 illustrates various operations associated with exchanging PCEF-connectivity information between interconnected DRAs according to the configuration-based option, which can be provided in certain embodiments of communication system 100. FIG. 3 illustrates various operations associated with exchanging PCEF-connectivity information between interconnected DRAs according to the request-based option, which can be provided in certain embodiments of communication system 100.

FIG. 2 includes PGW 122/PCEF 132, PCRF 118 and DRA 142 in Realm A. FIG. 2 also includes AF 116 within IMS 160 and includes PGW 124/PCEF 134 and DRA 144 in Realm B. DRA 142 includes session management module 162a, PCEF binding storage 164a, peer advertising module 166a and PCEF connectivity storage 168a. DRA 144 includes session management module 162b, PCEF binding storage 164b, peer advertising module 166b and PCEF connectivity storage 168b.

For the configuration-based option, as shown in FIG. 2, the operations can include configuring DRA 142 at 202a with origin-realm, origin-host PCEF-connectivity information for each PGW/PCEF host to which it is connected in each of one or more realms (e.g., origin-host=FQDN of PGW 122, origin-realm=IP domain 1). The operations can also include configuring DRA 144 at 202b with origin-realm, origin-host information for each PGW/PCEF host to which it is connected in each of one or more realms (e.g., origin-host=FQDN of PGW 124, origin-realm=IP domain 2).

In various embodiments, the configurations at 202a, 202b can be provided by a network operator, service provider, combinations thereof or the like. In various embodiments, the configurations at 202a, 202b can be performed when each respective DRA 142, 144 is added into the system and/or when a new PGW/PCEF is added into an existing realm and/or a new that can be served by each respective DRA 142, 144. In various embodiments, the PCEF-connectivity information configured for DRA 142 can be stored in PCEF connectivity storage 168a and the PCEF-connectivity information configured for DRA 144 can be stored in PCEF connectivity storage 168b.

At 204, the operations can include DRA 142, 144 exchanging PCEF-connectivity information between each other (e.g., between one or more interconnected DRAs in the system). In certain embodiments, the exchanging of PCEF-connectivity information can include DRA 142 advertising, via peer advertising module 166a, a single CER message including PCEF-connectivity AVPs for each PGW/PCEF to which it is connected (e.g., PGW 122/PCEF 132) to DRA 144 via the 'Dr' interface. In certain embodiments, the exchanging of PCEF-connectivity information can include DRA 144 advertising, via peer advertising module 166b, a single CER message including PCEF-connectivity AVPs for each PGW/PCEF to which it is connected (e.g., PGW 124/PCEF 134) to DRA 142 via the 'Dr' interface.

At 206a, DRA 142 can store PCEF-connectivity information received from DRA 144. In certain embodiments, the PCEF-connectivity information received from DRA 144 can be stored in PCEF connectivity storage 168a. At 206b, DRA 144 can store PCEF-connectivity information received from DRA 142. In certain embodiments, the PCEF-connectivity information received from DRA 142 can be stored in PCEF connectivity storage 168a.

Referring to FIG. 3, illustrates various operations associated with exchanging PCEF-connectivity information between interconnected DRAs 142, 144 according to the request-based option in accordance with an embodiment of communication system 100. FIG. 3 includes UE 112 within RAN 150, PGW 122/PCEF 132, PCRF 118 and DRA 142 in Realm A. FIG. 3 includes UE 114 within RAN 152, PGW 124/PCEF 134 and DRA 144 in Realm B. FIG. 3 also includes AF 116 within IMS 160. DRA 142 includes session management module 162a, PCEF binding storage 164a, peer advertising module 166a and PCEF connectivity storage 168a. DRA 144 includes session management module 162b, PCEF binding storage 164b, peer advertising module 166b and PCEF connectivity storage 168b.

In certain embodiments, the request-based option can provide for a gradual build-up of PCEF-connectivity information between interconnected DRAs in communication system 100 based on receiving a first request for PCRF allocation from a given PCEF coupled to a given DRA in the system. At any time, UE 114 may seek to establish a connection with PGW 124/PCEF 134. Thus, operations can begin at 302 in which UE 114 may seek to establish a connection with PGW 124/PCEF 134. At 304, PCEF 134 may communicate a CCR-I message to DRA 144. In various embodiments, the CCR-I can include the origin-host information of PGW 124 (e.g. FQDN of PGW 124), the origin-realm information of PGW 124 (e.g., IP domain 2), the subscription ID of UE 114 (e.g., IMSI2), the access point name (APN) for the session and the UE 114 IP address (e.g., 10.0.0.100). At 306, DRA 144 may store origin-host and origin-realm information for PGW 124/PCEF 134 (e.g., used to create an {origin-host, origin-realm} PCEF-connectivity AVP) in PCEF connectivity storage 168b. In certain embodiments, DRA can also create an {origin-host, origin-realm} binding for UE 114 associating identifying information for UE 114 (e.g., subscription ID, IP address, etc.) with the origin-host, origin-realm information for PGW 124/PCEF 134 and may store the binding in PCEF binding storage 164b. At 308, DRA 144, via peer advertising module 166b, may advertise the {origin-host, origin-realm} PCEF-connectivity AVP for PGW 124/PCEF 134 embedded in a CER message to DRA 142 via the 'Dr' interface. At 310, DRA 144 may store the PCEF-connectivity information received from DRA 144 in PCEF connectivity storage 168a.

Although not shown in FIG. 3, similar operations could be performed for PGW 122/PCEF 132 upon receiving a first request for PCRF allocation, for example, for a connection request initiated from UE 112. Thus, as shown in FIGS. 2-3 PCEF-connectivity information for DRAs 142, 144 can be exchanged between the interconnected DRAs in communication system 100 using the configuration-based option or the request-based option.

Figure 4:
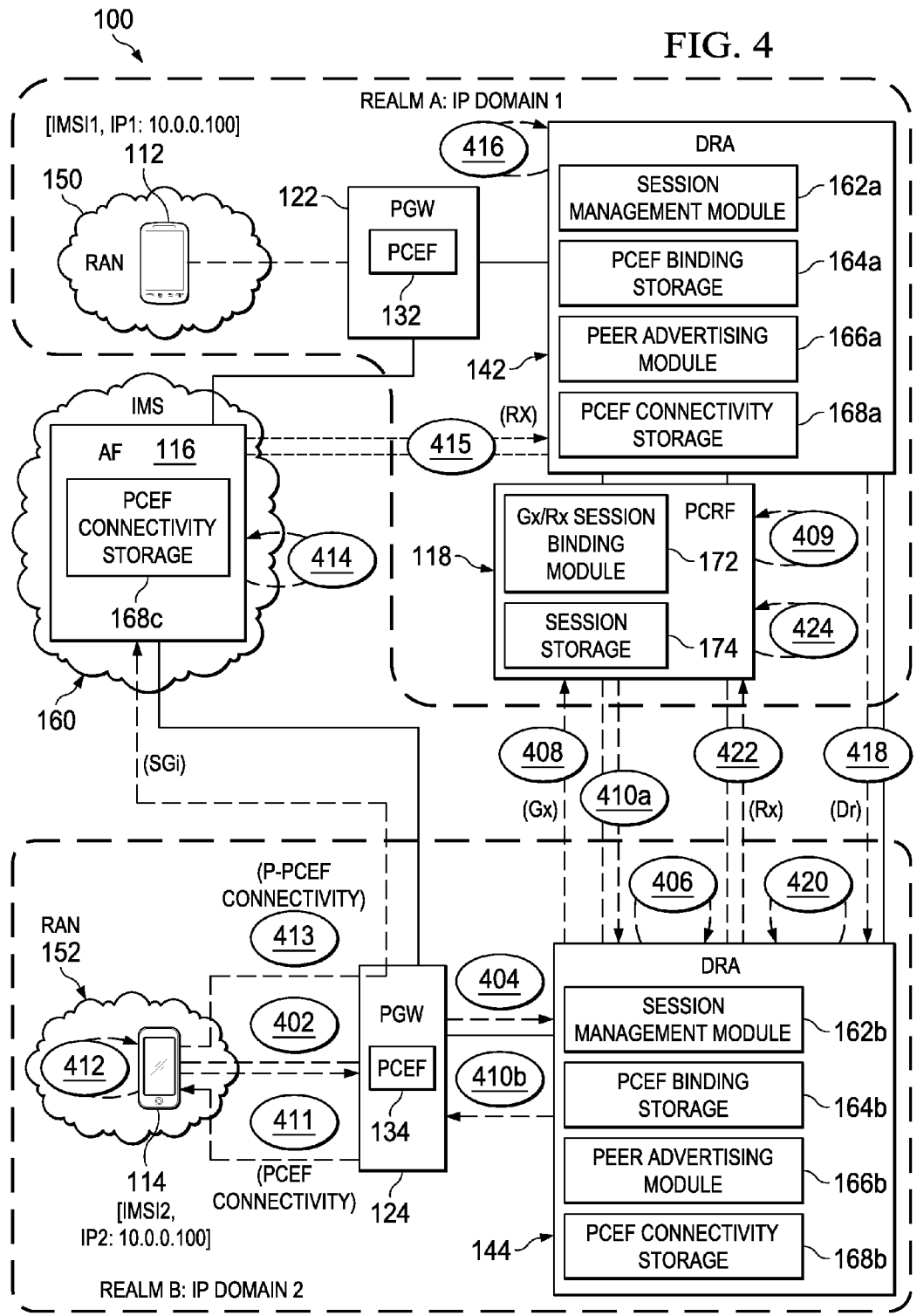
FIG. 4 is a simplified block diagram illustrating example details associated with providing PCRF discovery in a network environment in accordance with one potential embodiment of the communication system.

Turning to FIG. 4, FIG. 4 is a simplified block diagram illustrating example details associated with providing PCRF discovery in accordance with one potential embodiment of communication system 100. In particular, FIG. 4 illustrates various operations that associated with providing PCRF discovery in accordance with one potential embodiment of communication system 100. FIG. 4 includes UE 112 within RAN 150, PGW 122/PCEF 132, PCRF 118 and DRA 142 in Realm A. FIG. 4 includes UE 114 within RAN 152, PGW 124/PCEF 134 and DRA 144 in Realm B. FIG. 4 also includes AF 116 within IMS 160. DRA 142 includes session management module 162a, PCEF binding storage 164a, peer advertising module 166a and PCEF connectivity storage 168a. DRA 144 includes session management module 162b, PCEF binding storage 164b, peer advertising module 166b and PCEF connectivity storage 168b. PCRF 118 includes Gx/Rx session binding module 172 and session storage 174. AF 116 includes PCEF connectivity storage 168c. It is assumed for the operations described in FIG. 4 that PCEF-connectivity information has previously been exchanged between DRA 142, 144.

At any time, UE 114 may seek to establish a connection with PGW 124/PCEF 134. Thus, operations can begin at 402 in which UE 114 may seek to establish a connection with PGW 124/PCEF 134 (e.g., communicating a create session (CS) request message to PGW 124/PCEF 134. At 404, PGW 124/PCEF 134 may initiate Gx session establishment for UE 114 by communicating a CCR-I to DRA 144 including the origin-host information of PGW 124 (e.g. FQDN of PGW 124), the origin-realm information of PGW 124 (e.g., IP domain 2), the subscription ID of UE 114 (e.g., IMSI2), the access point name (APN) for the session and the UE 114 IP address (e.g., 10.0.0.100). At 406, DRA 144 may select a PCRF (e.g., PCRF 118) to serve the session for UE 114 and may create a first {origin-host, origin-realm} binding for the PCRF selection for UE 114 associated the origin-host and origin-realm information for PGW 124/134 with the UE 114 subscription ID, APN, UE 114 IP address and PCRF 118 IP address. In certain embodiments, the first binding for UE 114 can be stored in PCEF binding storage 164b. In certain embodiments, a DRA can select a PCRF to serve a UE session based on configuration, load-balancing algorithms, combinations thereof or the like.

At 408, DRA 144 may proxy the CCR-I message over the Gx interface to PCRF 118 including the origin-host and origin-realm information for PGW 124/PCEF 134, the UE subscription ID, APN and UE IP address. At 409, PCRF 118 may configure a Gx IP-CAN session for UE 114. In various embodiments, PCRF 118 may store information associated with the Gx session for UE 114 in session storage 174. At 410a, PCRF 118 may communicate a credit control answer (CCA) to DRA 144. The CCA message can be communicated from DRA to PGW 124/PCEF 134 at 410b and at 411, PGW 124/PCEF 134 can communicate a create session (CS) response to UE 114 indicating creation of the Gx IP-CAN session. The CS response can include the PCEF-connectivity IE for PGW 124/PCEF (e.g., origin-host=FQDN of PGW 124, origin-realm=IP domain 2).

At 412, UE 114 may configure the P-PCEF-connectivity IE based on the PCEF-connectivity IE received from PGW 124/PCEF 134. At any time, UE 114 may initiate an SIP session (e.g., an Rx session) with AF 116 (e.g., via IMS 160). To initiate an Rx session, UE 114 may communicate an SIP invite via the $SGi_B$ interface to AF 116 at 413 including the P-PCEF-connectivity IE containing the origin-host, origin-realm information for PGW 124/PCEF 134. At 415, AF 116 may store the PCEF-connectivity information for PGW 124/PCEF 134 in a DIAMETER-based PCEF-connectivity AVP in PCEF connectivity storage 168c.

At 415, AF 116 can request authorization for quality of service (QoS) resources for UE 114 via an AAR message communicated to DRA 142 to which it is connected over the Rx interface. In various embodiments, the AAR message can include the origin-host and origin-realm identifying information for AF 116 (as AF 116 is the originator of the AAR message), destination-host and destination-realm identifying information (e.g., host/realm information for DRA 142), the PCEF-connectivity AVP including the {origin-host, origin-realm} information for PGW 124/PCEF 134, the IP address for UE 114 and the subscription ID for UE 114.

At 416, DRA 142, via session management module 162a, can perform a look-up on the PCEF-connectivity AVP received in the AAR message against PCEF-connectivity information stored in PCEF connectivity storage 168a to determine the realm (e.g., IP domain 2) and a corresponding DRA associated thereto (e.g., DRA 144) which may be serving the Gx session for UE 114. Recall, PCEF-connectivity information can be exchanged between interconnected DRAs 142, 144 via the configuration-based option or the request-based option in various embodiments. As discussed, it is assumed for purposes of the present operational example that PCEF-connectivity information for PGW 124/PCEF 134 has been previously stored in PCEF connectivity storage 168a using one of these options. Based on the look-up and determination DRA 142 may forward the AAR message (including the PCEF-connectivity AVP) to DRA 144 at 418 via the 'Dr' interface. At 420, DRA 142 can perform a look-up on PCEF binding storage 164b to match the origin-host, origin-realm information contained in the PCEF-connectivity AVP to the {origin-host, origin-realm Upon receiving the AAR message, DRA 144 can perform a look-up, via session management module 162a, on PCEF binding storage 164b to match the origin-host, origin realm information contained in the PCEF-connectivity AVP and UE 114 identifying information contained in the AAR message (e.g., subscription ID, IP address, etc.) to the {origin-host, origin-realm} binding for UE 114 to identify PCRF 118 associated with the Gx session for UE 114.

Based on the look-up and identification of PCRF 118, DRA 144 may communicate the AAR message to PCRF 118 via the Rx interface at 422. The AAR message can include the origin-host, origin-realm identifying information of AF 116, destination-host and destination-realm identifying information (e.g., host/realm information for DRA 142), the PCEF-connectivity AVP including the origin-host, origin-realm information for PGW 124/PCEF 134, the IP address for UE 114 and the subscription ID for UE 114. At 424, PCRF 118, via Gx/Rx session binding module 172, can perform a look-up on session storage 174 using the origin-host, origin-realm information contained in the PCEF-connectivity AVP and the UE identification information in the AAR message against its stored Gx IP-CAN session information for UE 114 (e.g., identifying PGW 124/PCEF 134 for the Gx session) to identify the Gx session for UE 114 and bind the Rx and Gx sessions for UE 114. Accordingly, communication system 100 can provide a method to facilitate PCRF discovery and Gx/Rx session binding in a network environment including multiple interconnected DRAs in a certain embodiment.

Figure 5:
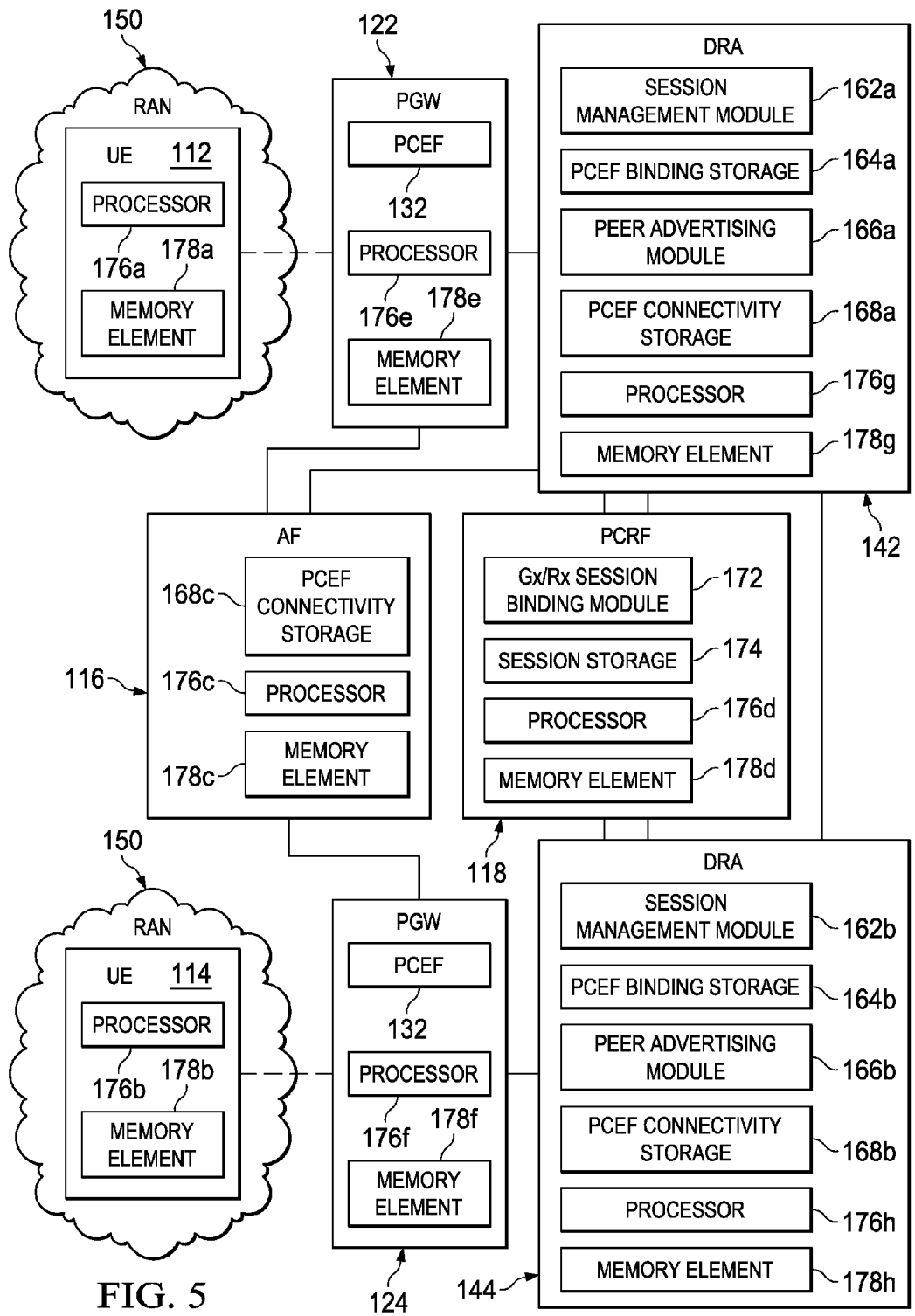
FIG. 5 is a simplified block diagram illustrating additional details associated with one potential embodiment of the communication system.

Turning to FIG. 5, FIG. 5 is a simplified block diagram illustrating additional details associated with one potential embodiment of the communication system. FIG. 5 includes UE 112 within RAN 150, AF 116 within IMS 160, PGW 122/PCEF 132, PCRF 118 and DRA 142 in Realm A. FIG. 4 includes UE 114 within RAN 152, PGW 124/PCEF 134 and DRA 144 in Realm B. DRA 142 includes session management module 162a, PCEF binding storage 164a, peer advertising module 166a and PCEF connectivity storage 168a. DRA 144 includes session management module 162b, PCEF binding storage 164b, peer advertising module 166b and PCEF connectivity storage 168b. PCRF 118 includes Gx/Rx session binding module 172 and session storage 174. AF 116 includes PCEF connectivity storage 168c. Additionally, each of respective UE 112, UE 114, AF 116, PCRF 118, PGW 122, PGW 124, DRA 142 and DRA 144 may each include a respective processor 176a-176h and a respective memory element 178a-178h. Hence, appropriate software and/or hardware is being provisioned in UE 112, UE 114, AF 116, PCRF 118, PGW 122, PGW 124, DRA 142 and DRA 144 in order to facilitate PCEF-connectivity exchanges, PCRF discovery and/or Gx/Rx session binding using the system and method provided by communication system 100. Note that in certain examples, certain storage can be consolidated with memory elements (or vice versa), or the storage can overlap/exist in any other suitable manner.

In one example implementation, UE 112, UE 114, AF 116, PCRF 118, PGW 122, PGW 124, DRA 142 and DRA 144 are network elements, which are meant to encompass network appliances, servers, routers, switches, gateways, bridges, loadbalancers, firewalls, processors, modules, or any other suitable device, component, element, or object operable to exchange information that facilitates or otherwise helps coordinate and/or manage PCEF-connectivity exchange, PCRF discovery and/or Gx/Rx session binding activities (e.g., for networks such as those illustrated in FIG. 1, etc.). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these devices may include any suitable algorithms, hardware, software, components, modules, interfaces, or objects that facilitate the operations thereof. This may be inclusive of appropriate algorithms and communication protocols that allow for the effective exchange of data or information.

In regards to the internal structure associated with communication system 100, each of UE 112, UE 114, AF 116, PCRF 118, PGW 122, PGW 124, DRA 142 and DRA 144 can include a memory element (e.g., respective memory element 178a-178h) for storing information to be used in achieving the PCEF-connectivity exchange, PCRF discovery and/or Gx/Rx session binding operations, as outlined herein. Additionally, each of these devices may include a hardware processor (e.g., respective processor 176a-176h) that can execute software or an algorithm to perform the PCEF-connectivity exchange, PCRF discovery and/or Gx/Rx session binding activities as discussed in this Specification. These devices may further keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element'. The information being tracked or sent to UE 112, UE 114, AF 116, PCRF 118, PGW 122, PGW 124, DRA 142 and DRA 144 could be provided in any database, register, control list, cache, or storage structure: all of which can be referenced at any suitable timeframe. Any such storage options may be included within the broad term 'memory element' as used herein. Similarly, any of the potential processing elements, modules, hardware and machines described herein should be construed as being encompassed within the broad term 'processor'. Each of the network elements and user equipment (e.g., mobile nodes) can also include suitable interfaces for receiving, transmitting, and/or otherwise communicating data or information in a network environment.

Note that in certain example implementations, the PCEF-connectivity exchange, PCRF discovery and/or Gx/Rx session binding operations as outlined herein may be implemented by logic encoded in one or more tangible media, which may be inclusive of non-transitory media (e.g., embedded logic provided in an ASIC, in digital signal processor (DSP) instructions, software [potentially inclusive of object code and source code] to be executed by a processor, or other similar machine, etc.). In some of these instances, memory elements [as shown in FIG. 5] can store data used for the operations described herein. This includes the memory elements being able to store software, logic, code, or processor instructions that are executed to carry out the activities described herein. A processor, including a hardware processor, can execute any type of instructions associated with the data to achieve the operations detailed herein. In one example, the processors [as shown in FIG. 5] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a digital signal processor (DSP), an EPROM, an electrically erasable programmable read only memory (EEPROM)) or an ASIC that includes digital logic, software, code, electronic instructions, or any suitable combination thereof.

Figure 6:
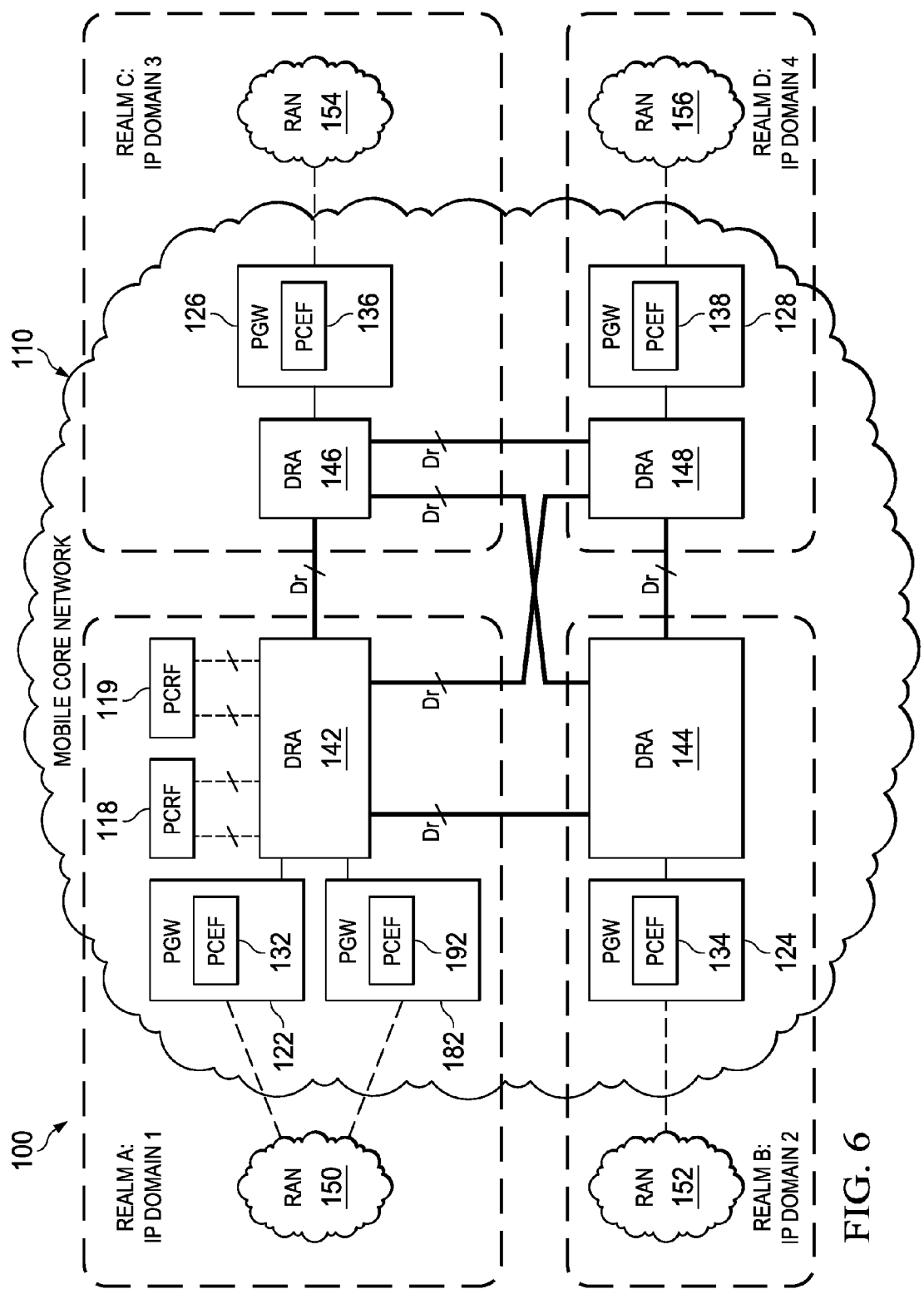
FIGS. 6-7 are simplified block diagrams illustrating example details associated with various example network configurations that can be used to facilitate providing PCRF discovery in accordance with various potential embodiments of the communication system.
Figure 7:
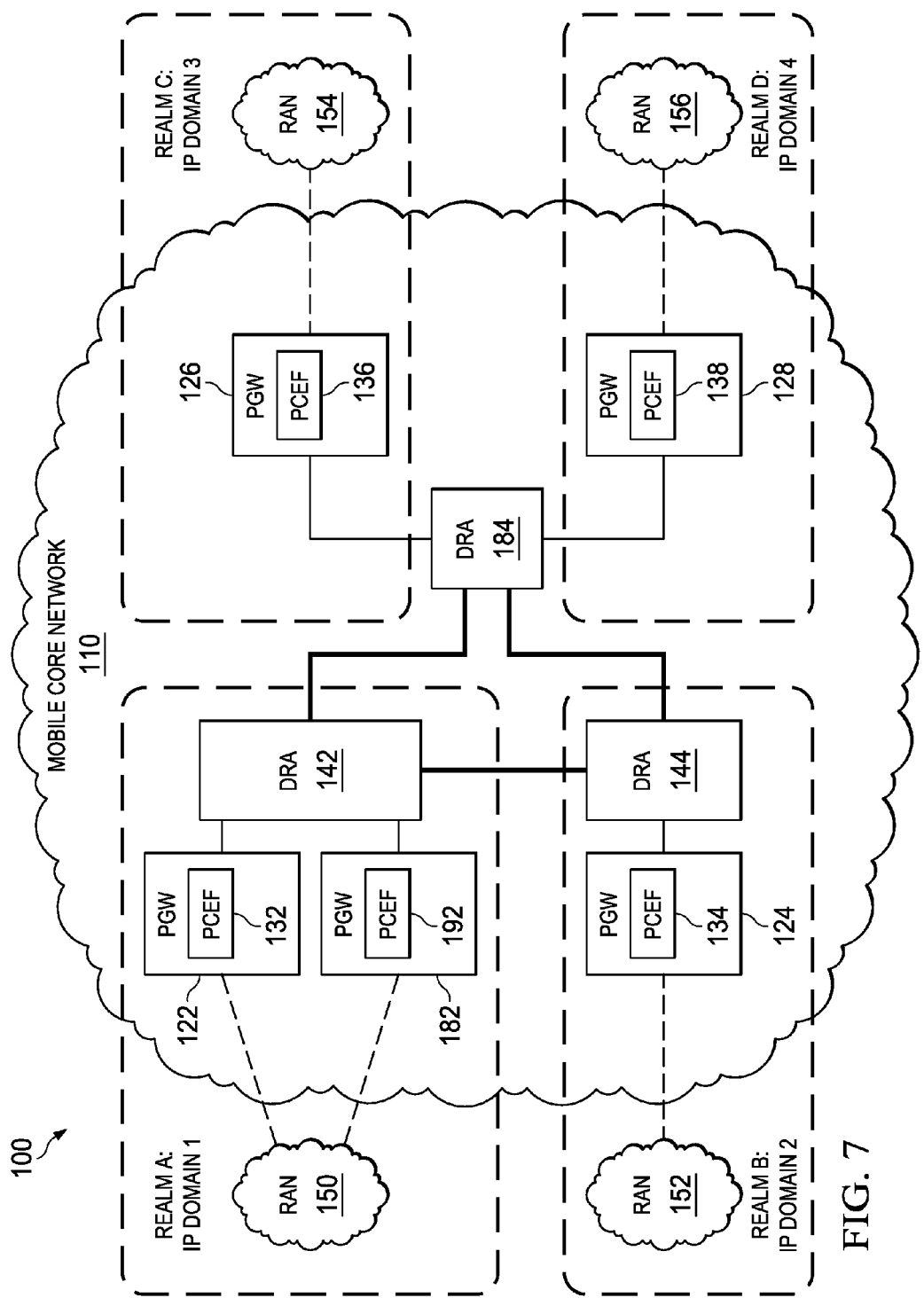
Figure 8:
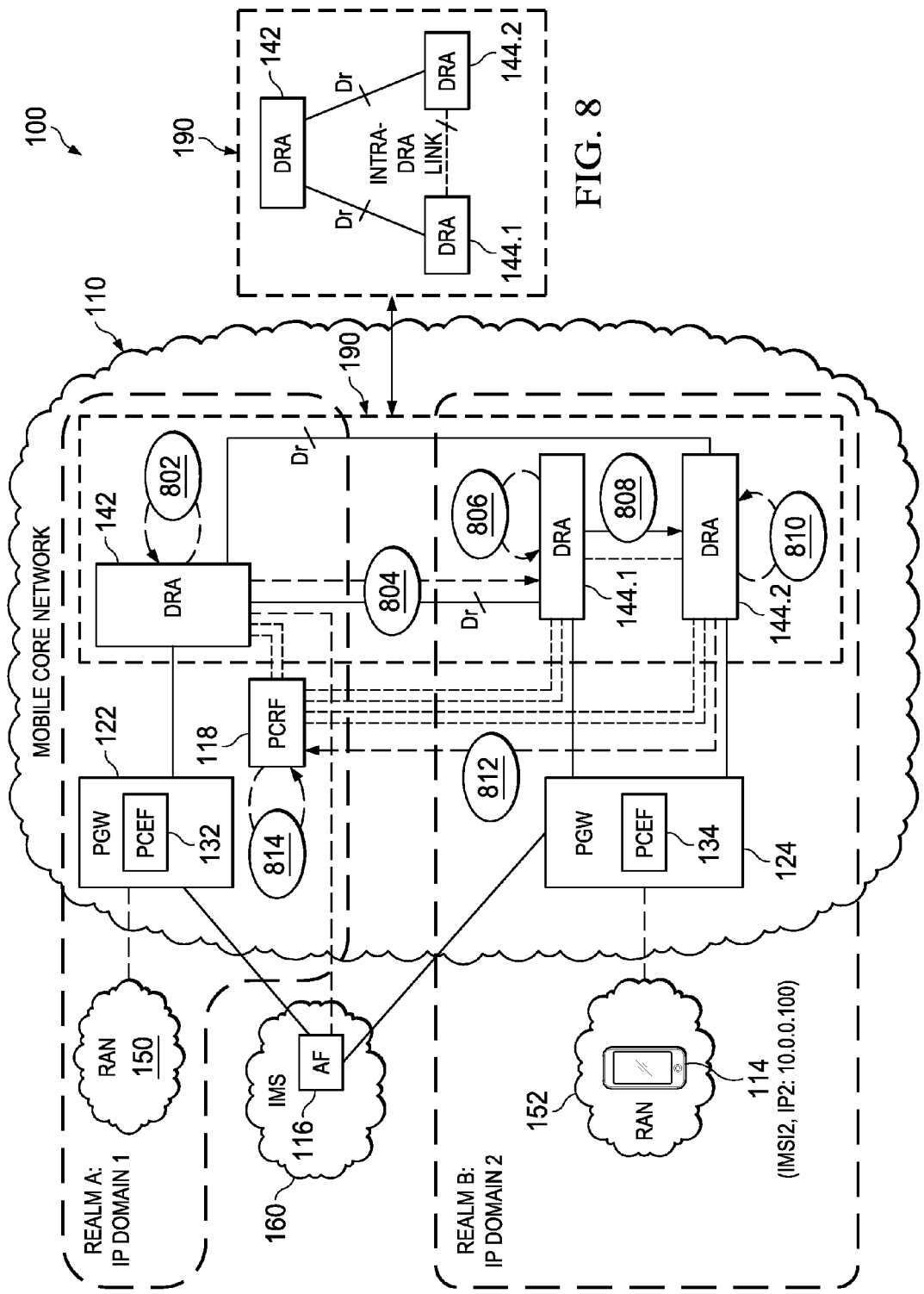
FIGS. 8-9 are simplified block diagrams illustrating example details associated with providing PCRF discovery in various DRA load balancing configurations in accordance with various potential embodiments of the communication system.

Referring to FIGS. 6-8, FIGS. 6-8 are simplified block diagrams illustrating example details associated with various example network configurations that can be used to facilitate providing PCRF discovery in accordance with various potential embodiments of the communication system. In particular, FIG. 6 includes first DRA 142 coupled to PGW 122/PCEF 132 and another PGW 182/PCEF 192, each of which further interfaces with RAN 150 in Realm A (IP domain 1) of mobile core network 110; second DRA 144 coupled to PGW 124/PCEF 134, which further interfaces with RAN 152 in Realm B (IP domain 2); a third DRA 146 coupled to a PGW 126/PCEF 136, which further interfaces with a RAN 154 in a Realm C (IP domain 3); and a fourth DRA 148 coupled to a PGW 128/PCEF 138, which further interfaces with a RAN 156 in a Realm D (IP domain 4). Each DRA 142, 144, 146 and 148 are interconnected via the 'Dr' interface, which may enable each DRA to exchange PCEF-connectivity information in the DRA network. Thus, FIG. 6 illustrates that multiple DRAs can be interconnected across a plurality of realms in communication system 100 and further, that a given DRA (e.g., DRA 142) can serve multiple PGW/PCEFs in a given realm (e.g., Realm A). Also shown in FIG. 6, PCRF 118 and another PCRF 119 can be included in IP domain 1. Accordingly, in various embodiments, one or more PCRFs can be included in each IP domain. PCRF 118 and PCRF 119 can be in communication with each DRA 144, 146 and 148, similar to that as shown in FIG. 1 with respect to PCRF 118, which is in communication both with DRA 142 and DRA 144. The interconnection of PCRF 118 and PCRF 119 with DRAs 144, 146 and 148 is not illustrated in FIG. 6 in order to illustrate other features of communication system 10.

Turning to FIG. 7, FIG. 7 illustrates other example details associated with another example network configuration that can be used to facilitate PCRF discovery in accordance with one potential embodiment of communication system 100. FIG. 7 includes first DRA 142 coupled to PGW 122/PCEF 132 and PGW 182/PCEF 192, each of which further interfaces with RAN 150 in Realm A (IP domain 1) of mobile core network 110; second DRA 144 coupled to PGW 124/PCEF 134, which further interfaces with RAN 152 in Realm B (IP domain 2); and another DRA 184 coupled to PGW 126/PCEF 136 in Realm C and also to PGW 128/138 in Realm D. Thus, FIG. 6 illustrates that a given DRA (e.g., DRA 184) can serve multiple PGW/PCEFs (e.g., PGW 126/PCEF 136, PGW 128/PCEF 138) across multiple realms (e.g., Realm C, Realm D).

Figure 9:
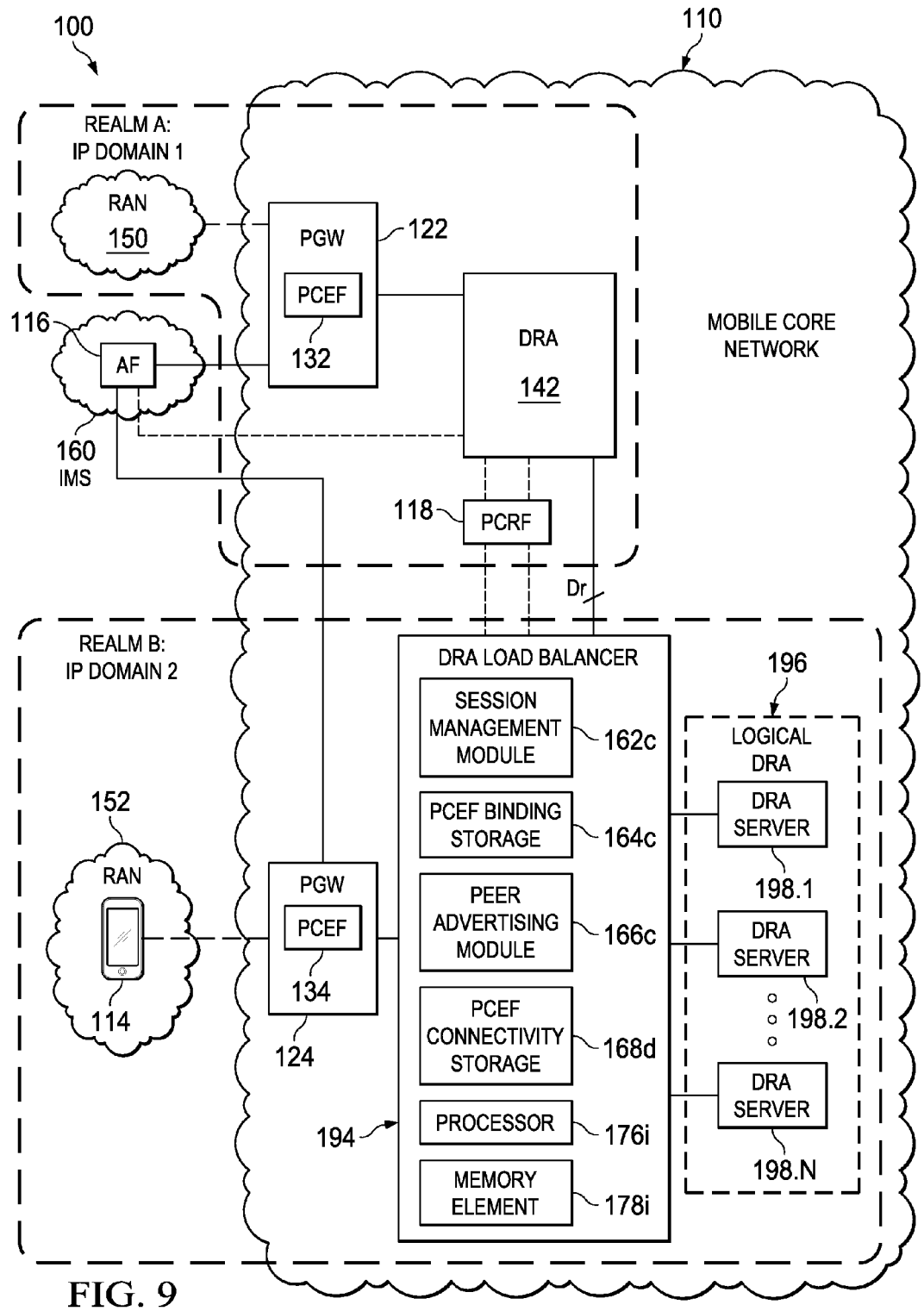

Turning to FIGS. 8-9, FIGS. 8-9 are simplified block diagrams illustrating example details associated with providing PCRF discovery in various DRA load balancing configurations in accordance with various potential embodiments of communication system 100. FIG. 8 includes mobile core network 110, UE 114, PCRF 118, PGW 122/PCEF 132, PGW 124/PCEF 134, DRA 142, RAN 150 and RAN 152. FIG. 8 also includes AF 116 within IMS 160. FIG. 8 also includes a pair of DRAs 144.1 and 144.2 in Realm B, each coupled to PGW 124/PCEF 134. DRA 142, DRA 144.1 and DRA 144.2 may be interconnected in a DRA network 190, which is further illustrated in FIG. 8 including DRA 142 interconnected to DRA 144.1 and 144.2 via the 'Dr' interface and DRA 144.1 interconnected to DRA 144.2 via an intra-DRA link. For FIG. 8, PGW 124/PCEF 134 can load balance UE sessions between DRA 144.1-144.2 depending on various network conditions (e.g., congestion, number of sessions being serviced by a particular DRA, etc.). Various operations are shown in FIG. 8 illustrating PCRF discovery in a DRA load balancing environment.

Various assumptions are made for the example operations shown in FIG. 8 to highlight PCRF discovery in the DRA load balancing environment. These assumptions include: DRA 144.2 is serving a Gx IP-CAN session for UE 114, which was previously established via a CCR-I exchange between PCEF 134, DRA 144.2 and PCRF 118; DRA 144.2 has created an {origin-domain, origin-realm} binding for the UE session; DRA 144.2 has exchanged PCEF-connectivity information with DRA 144.1 and DRA 142 (e.g., using either the configuration-based option or the request-based option); UE 114 has initiated an SIP invite to AF 116 including a P-PCEF-connectivity IE including origin-host information for PGW 124 (e.g., FQDN of PGW 124) and origin-realm information for PGW 124/PCEF 134 (e.g., identifying IP domain 2); and AF 116 has communicated an AAR message to DRA 142 including the corresponding information from the P-PCEF-connectivity IE.

Accordingly, the operations shown in FIG. 8 begin at 802, in which DRA 142 can perform look-up on a PCEF connectivity AVP received from AF 116 in the AAR message (e.g., similar to operation 416 as described in FIG. 4) against PCEF-connectivity information stored in DRA 142 to determine the realm (e.g., IP Domain 2) and a corresponding DRA associated thereto (e.g., either DRA 144.1 or DRA 144.2), which may be serving the Gx IP-CAN session for UE 114. As both DRA 144.1 and DRA 144.2 may communicate PCEF-connectivity information to DRA 142 at various times (e.g., depending on whether the configuration-based option or the request-based option is implemented), DRA 142 may be unable to determine which of the load balancing DRAs may actually be serving the Gx IP-CAN session for UE 114. Thus, DRA 142 can merely select one of the DRAs to which to forward the AAR message, say, for example DRA 144.1 and may forward the message to DRA 144.1 at 804. Recall, because IP addresses may be re-used between IP domain 1 and IP domain 2, the IP address of UE 114 may be an insufficient indicator for DRA 142 to determine the correct DRA servicing the Gx IP-CAN session for UE 114 within IP domain 2.

At 806, DRA 144.1 can determine based, at least in part, on the subscription ID and IP address of UE 114 that it does not have a binding stored for UE 114 and, as such, can forward the message to another DRA (e.g., DRA 144.2) to which it may be connected via the intra-DRA link at 808.

Upon receiving the AAR message, DRA 144.2 can perform a look-up via its PCEF binding storage to match the origin-host, origin realm information contained in the PCEF-connectivity AVP of the AAR message and UE 114 identifying information contained in the AAR message (e.g., subscription ID, IP address, etc.) to the {origin-host, origin-realm} binding for UE 114 to identify PCRF 118 associated with the Gx session for UE 114. Based on the look-up and identification of PCRF 118, DRA 144.2 may communicate the AAR message to PCRF 118 at 812. The AAR message can include the origin-host, origin-realm identifying information of AF 116, destination-host and destination-realm identifying information (e.g., host/realm information for DRA 142), the PCEF-connectivity AVP including the origin-host, origin-realm information for PGW 124/PCEF 134, the IP address for UE 114 and the subscription ID for UE 114. At 814, PCRF 118 can perform a look-up on its session storage using the origin-host, origin-realm information contained in the PCEF-connectivity AVP and the UE identification information in the AAR message against its stored Gx IP-CAN session information for UE 114 (e.g., identifying PGW 124/PCEF 134 for the Gx session) to identify the Gx session for UE 114 and bind the Rx and Gx sessions for UE 114. Accordingly, communication system 100 can provide a method to facilitate PCRF discovery and Gx/Rx session binding in a network environment including multiple interconnected DRAs and multiple load balanced DRAs in a certain embodiment.

Turning to FIG. 9, FIG. 9 is a simplified block diagram illustrating other example details associated with providing PCRF discovery in another DRA load balancing configuration in accordance with one potential embodiments of communication system 100. FIG. 9 includes mobile core network 110, UE 114, PCRF 118, PGW 122/PCEF 132, PGW 124/PCEF 134, DRA 142, RAN 150 and RAN 152. FIG. 9 also includes AF 116 within IMS 160. FIG. 9 also includes a DRA load balancer 194 in Realm B coupled to PGW 124/PCEF 134 and PCRF 118. DRA load balancer 194 may be interconnected to DRA 142 via the 'Dr' interface and may also be in communication with a plurality of DRA servers 198.1-198.N, which may collectively represent a logical DRA 196.

DRA load balancer 194 can include a session management module 162c, PCEF binding storage 164c, a peer advertising module 166c, PCEF connectivity storage 168d, a processor 176i and a memory element 178i. Hence, appropriate hardware and software can be provisioned in DRA load balancer 194 in order to facilitate PCEF-connectivity exchanges, PCRF discovery and/or Gx/Rx session binding using the system and method provided by communication system 100.

In certain embodiments, DRA load balancer 194 can advertise, via peer advertising module 166c, PCEF-connectivity information for each of one or more PGW/PCEFs to which it may be connected across each of one or more realms to one or more peer DRAs to which it may be connected in communication system 100. PCEF-connectivity information for DRA load balancer 194 and for one or more DRAs to which it may be connected can be stored in PCEF connectivity storage 168d. In essence, DRA load balancer 194 can be provisioned with software and hardware which may enable it to perform functions similar to that of a DRA with respect to exchanging PCEF-connectivity information with other interconnected DRAs to which it may be connected across other realms of communication system 100.

During operation, in certain embodiments, DRA load balancer 194 can select a particular DRA server (e.g., DRA server 198.2) to service a Gx IP-CAN session for a given UE (e.g., UE 114) based on various network conditions. In certain embodiments, DRA load balancer 194 can create, via session management module 162c, a {origin-host, origin-realm} binding for a Gx IP-CAN session for the UE, which can be stored in PCEF binding storage 164c. Upon receiving a client request (e.g., AAR message) for an Rx session for the UE forwarded from another interconnected DRA (e.g., DRA 142), DRA load balancer 194 can identify, via session management module 162c, the particular DRA server (e.g., DRA server 198.2) associated with the UE for which the request was initiated and can also identify the PCRF associated with the UE Gx IP-CAN session based on its stored {origin-host, origin-realm} binding, UE identifying information and associated PCRF IP address to facilitate Gx/Rx session binding for the UE via the PCRF. Accordingly, communication system 100 can be configured with a DRA load balancer to facilitate providing PCRF discovery in a network environment in accordance with certain embodiments of communication system 100.

Figure 10:
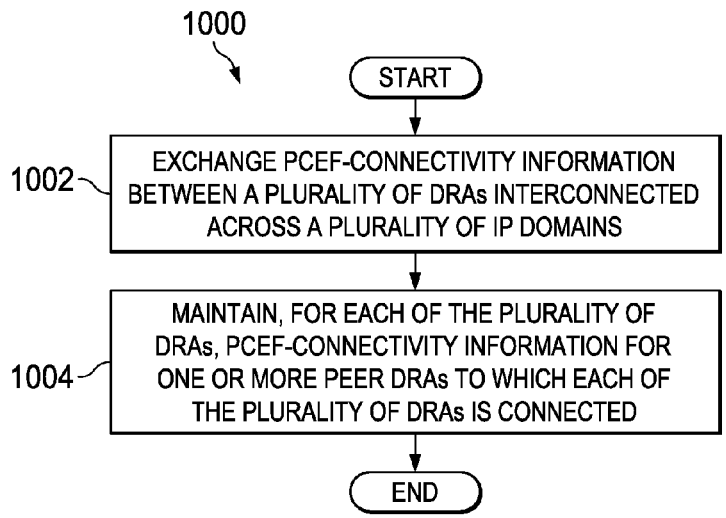
FIG. 10 is a simplified flow diagram illustrating example operations associated with exchanging policy and charging enforcement function (PCEF) connectivity information for DRAs in accordance with one potential embodiment of the communication system.

Turning to FIG. 10, FIG. 10 is a simplified flow diagram illustrating example operations 1000 associated with exchanging PCEF-connectivity information for DRAs in accordance with one potential embodiment of communication system 100. In various embodiments, the operations can be performed by a given DRA (e.g., any of DRAs 142, 144, 146, 148, 184, 144.1 and/or 144.2) and/or a load balancer (e.g., DRA load balancer 194), which can be provisioned in communication system 100.

At 1002, the operations can include exchanging PCEF-connectivity information between a plurality of DRAs interconnected across a plurality of IP domains. At 1004, the operations can include maintaining, for each of the plurality of DRAs, PCEF-connectivity information for one or more peer DRAs to which each of the plurality of DRAs is interconnected. In various embodiments, PCEF-connectivity information can be exchanged according to a configuration-based option or a request-based option, as discussed herein in this Specification. In various embodiments, the PCEF-connectivity information maintained for a particular DRA can include at least one of: PCEF-connectivity information for one or more peer DRAs to which the particular DRA is interconnected in a same IP domain as the particular DRA; PCEF-connectivity information for one or more peer DRAs to which the particular DRA is interconnected in a different IP domain as the particular DRA; and PCEF-connectivity information for a DRA load balancer.

Figure 11:
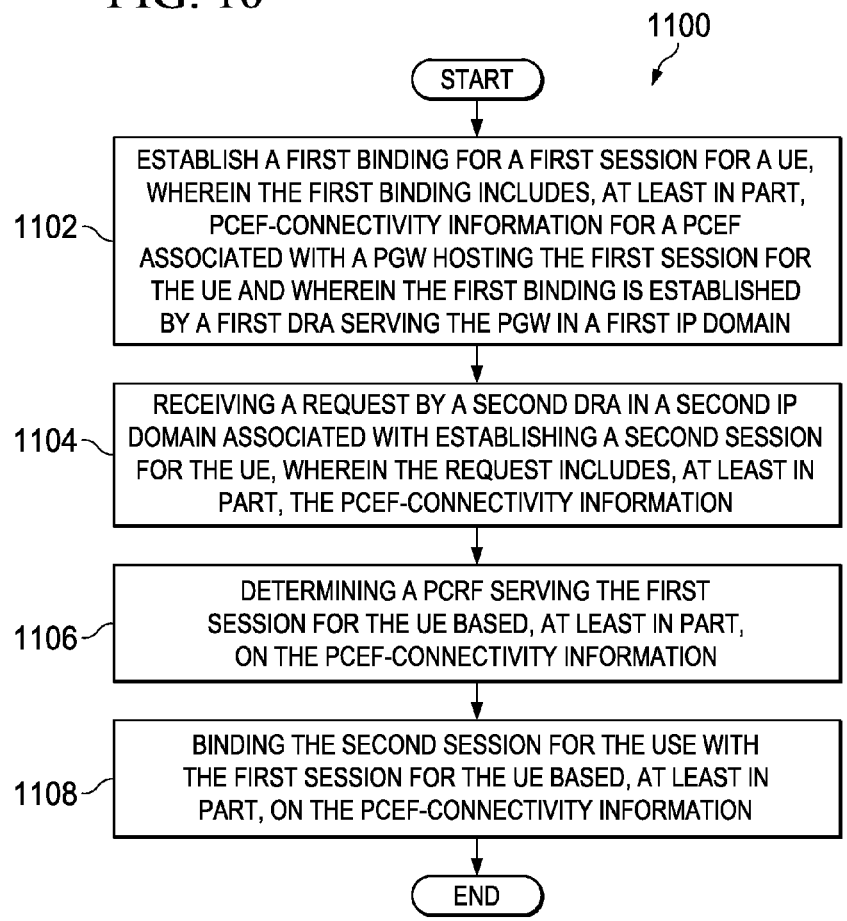
FIG. 11 is a simplified flow diagram illustrating example operations associated with providing PCRF discovery in a network environment in accordance with one potential embodiment of the communication system.

Turning to FIG. 11, FIG. 11 is a simplified flow diagram illustrating example operations 1100 associated with providing PCRF discovery in a network environment in accordance with one potential embodiment of the communication system. In various embodiments, the operations can be performed by a given UE (e.g., UE 112 and/or UE 114), a given AF (e.g., AF 116), a given PCRF (e.g., PCRF 118), a given PGW/PCEF (e.g., any of PGW 122/PCEF 132 and/or PGW 124/PCEF 134), a given DRA (e.g., any of DRAs 142, 144, 146, 148, 184, 144.1 and/or 144.2) and/or a load balancer (e.g., DRA load balancer 194), which can be provisioned in communication system 100.

At 1102, the operations can include establishing a first binding for a first session for a UE (e.g., UE 114). The first binding can include, at least in part, PCEF-connectivity information for a PCEF associated with a PGW (e.g., PGW 124) hosting the first session for the UE. The first binding is established by a first DRA (e.g., DRA 144) serving the PGW in a first IP domain. At 1104, the operations can include receiving a request by second DRA in a second IP domain associated with establishing a second session for the UE, wherein the request includes, at least in part, the PCEF-connectivity information for the UE. At 1106, the operations can include determining a PCRF (e.g., PCRF 118) serving the first session for the UE based, at least in part, on the PCEF-connectivity information. At 1108, the operations can include binding the second session for the UE with the first session for the UE based, at least in part, on the PCEF-connectivity information.

Note that in this Specification, references to various features (e.g., elements, structures, modules, components, steps, operations, characteristics, etc.) included in 'one embodiment', 'example embodiment', 'an embodiment', 'another embodiment', 'some embodiments', 'various embodiments', 'other embodiments', 'alternative embodiment', 'certain embodiments' and the like are intended to mean that any such features are included in one or more embodiments of the present disclosure, but may or may not necessarily be combined in the same embodiments. Note also that a module as used herein this Specification, can be inclusive of an executable file comprising instructions that can be understood and processed on a computer, and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 100 may be applicable to other exchanges or routing protocols. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   establishing a first binding for a first session for a user equipment (UE), wherein the first binding includes, at least in part, policy charging and enforcement function (PCEF) connectivity information for a PCEF associated with a packet data network gateway hosting the first session for the UE, wherein the first binding is established by a first DIAMETER routing agent (DRA) serving the packet data network gateway in a first IP domain and wherein the PCEF connectivity information comprises an origin-host identifier and an origin-realm identifier for the packet data network gateway;
   receiving a request by a second DRA in a second IP domain associated with establishing a second session for the UE, wherein the request includes, at least in part, the PCEF connectivity information;
   forwarding the request from the second DRA to the first DRA based, at least in part, on the origin-realm identifier included in the PCEF connectivity information;
   determining a policy charging and rules function (PCRF) serving the first session for the UE based, at least in part, on the PCEF connectivity information; and
   binding the second session for the UE with the first session for the UE based, at least in part, on the PCEF connectivity information.

2. The method of claim 1, wherein the first session for the UE is associated with a Gx session for the UE and wherein the second session for the UE is associated with an Rx session for the UE.

3. The method of claim 1, wherein the origin-host identifier identifies the packet data network gateway using a fully qualified domain name (FQDN) for the packet data network gateway and the origin-realm identifier identifies the first IP domain.

4. The method of claim 1, further comprising:
receiving, by the first DRA, a request from the PCEF associated with the packet data network gateway served by the first DRA for a PCRF allocation for the first session for the UE; and
selecting, by the first DRA, the PCRF to serve the first session for the UE.

5. The method of claim 1, wherein the first binding further includes, at least one of:
an identity of the UE;
an IP address assigned to the UE for the first session; and
an identifier of the PCRF serving the first session for the UE.

6. The method of claim 5, wherein the determining is performed by the first DRA in the first IP domain based on the first binding.

7. The method of claim 1, wherein the request is an Authorization and Authentication Request (AAR) message received for the UE.

8. One or more non-transitory tangible media encoding logic that includes instructions for execution that when executed by a processor, is operable to perform operations comprising:
establishing a first binding for a first session for a user equipment (UE), wherein the first binding includes, at least in part, policy charging and enforcement function (PCEF) connectivity information for a PCEF associated with a packet data network gateway hosting the first session for the UE, wherein the first binding is established by a first DIAMETER routing agent (DRA) serving the packet data network gateway in a first IP domain and wherein the PCEF connectivity information comprises an origin-host identifier and an origin-realm identifier for the packet data network gateway;
receiving a request by a second DRA in a second IP domain associated with establishing a second session for the UE, wherein the request includes, at least in part, the PCEF connectivity information;
forwarding the request from the second DRA to the first DRA based, at least in part, on the origin-realm identifier included in the PCEF connectivity information;
determining a policy charging and rules function (PCRF) serving the first session for the UE based, at least in part, on the PCEF connectivity information; and
binding the second session for the UE with the first session for the UE based, at least in part, on the PCEF connectivity information.

9. The media of claim 8, wherein the first session for the UE is associated with a Gx session for the UE and wherein the second session for the UE is associated with an Rx session for the UE.

10. The media of claim 8, wherein the origin-host identifier identifies the packet data network gateway using a fully qualified domain name (FQDN) for the packet data network gateway and the origin-realm identifier identifies the first IP domain.

11. The media of claim 8, wherein the first binding further includes, at least one of:
an identity of the UE;
an IP address assigned to the UE for the first session; and
an identifier of the PCRF serving the first session for the UE.

12. The media of claim 8, wherein the request is an Authorization and Authentication Request (AAR) message received for the UE.

13. The media of claim 8, the operations further comprising:
receiving, by the first DRA, a request from the PCEF associated with the packet data network gateway served by the first DRA for a PCRF allocation for the first session for the UE; and
selecting, by the first DRA, the PCRF to serve the first session for the UE.

14. A system, comprising:
a first DIAMETER routing agent (DRA) comprising:
a memory element for storing data; and
a processor that executes instructions associated with the data, wherein the processor and the memory element cooperate such that the system is configured for:
establishing a first binding for a first session for a user equipment (UE), wherein the first binding includes, at least in part, policy charging and enforcement function (PCEF) connectivity information for a PCEF associated with a packet data network gateway hosting the first session for the UE, wherein the first binding is established by the first DRA serving the packet data network gateway in a first IP domain and wherein the PCEF connectivity information comprises an origin-host identifier and an origin-realm identifier for the packet data network gateway;
receiving a request by a second DRA in a second IP domain associated with establishing a second session for the UE, wherein the request includes, at least in part, the PCEF connectivity information;
forwarding the request from the second DRA to the first DRA based, at least in part, on the origin-realm identifier included in the PCEF connectivity information;
determining a policy charging and rules function (PCRF) serving the first session for the UE based, at least in part, on the PCEF connectivity information; and
binding the second session for the UE with the first session for the UE based, at least in part, on the PCEF connectivity information.

15. The system of claim 14, wherein the first session for the UE is associated with a Gx session for the UE and wherein the second session for the UE is associated with an Rx session for the UE.

16. The system of claim 14, wherein the origin-host identifier identifies the packet data network gateway using a fully qualified domain name (FQDN) for the packet data network gateway and the origin-realm identifier identifies the first IP domain.

17. The system of claim 14, wherein the system is further configured for:
receiving, by the first DRA, a request from the PCEF associated with the packet data network gateway served by the first DRA for a PCRF allocation for the first session for the UE; and
selecting, by the first DRA, the PCRF to serve the first session for the UE.

18. The system of claim 14, wherein the first binding further includes, at least one of:
an identity of the UE;
an IP address assigned to the UE for the first session; and an identifier of the PCRF serving the first session for the UE.

19. The system of claim 18, wherein the determining is performed by the first DRA in the first IP domain based on the first binding.

20. The system of claim 14, wherein the request is an Authorization and Authentication Request (AAR) message received for the UE.

* * * * *